US006774926B1

(12) United States Patent
Ellis et al.

(10) Patent No.: US 6,774,926 B1
(45) Date of Patent: Aug. 10, 2004

(54) PERSONAL TELEVISION CHANNEL SYSTEM

(75) Inventors: Michael D. Ellis, Boulder, CO (US); G. Victor Treyz, Larchmont, NY (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/518,844

(22) Filed: Mar. 3, 2000

Related U.S. Application Data

(60) Provisional application No. 60/152,537, filed on Sep. 3, 1999.

(51) Int. Cl.[7] ................................................ H04W 7/14

(52) U.S. Cl. ................................ 348/14.01; 348/14.08; 725/133

(58) Field of Search .................................. 725/141, 133, 725/153, 48, 87, 109–110; 348/14.01–14.02, 14.08–14.09, 14.11

(56) References Cited

U.S. PATENT DOCUMENTS

| | | | | |
|---|---|---|---|---|
| 5,323,445 A | * | 6/1994 | Nakatsuka | 348/14.09 |
| 5,512,937 A | * | 4/1996 | Beierle | 348/14.02 |
| 5,589,892 A | | 12/1996 | Knee et al. | 348/731 |
| 5,850,218 A | * | 12/1998 | LaJoie et al. | 725/45 |
| 6,175,861 B1 | * | 1/2001 | Williams et al. | 709/217 |
| 6,192,257 B1 | * | 2/2001 | Ray | 455/566 |
| 6,512,919 B2 | * | 1/2003 | Ogasawara | 455/422.1 |

FOREIGN PATENT DOCUMENTS

| | | | | |
|---|---|---|---|---|
| WO | WO 9826584 A1 | * | 6/1998 | H04N/5/445 |

OTHER PUBLICATIONS

"Apple Adds Six New Quick Time TV Channels," press release of Apple Corporation, printed from the internet at http://www.apple.com/pr/library1999/nov/09channels.html on Dec. 10, 1999.
"AltaVista: search" web page printed from the Internet at http://www.altavista.com/cgi–bin/query?mmdo+1&stype=simage on Dec. 10, 1999.
"Streaming QuickTime TV Channels," web page printed from the Internet at http://www.apple.com/quicktime/showcase/live/ on Dec. 10, 1999.
"Quick, Somebody Tell ABC It's Time For 'America's Most Professional Home Videos'" web pages printed from the Internet at http://www.apple.com/quicktime/authoring on Dec. 10, 1999.

* cited by examiner

*Primary Examiner*—Vivek Srivastava
*Assistant Examiner*—Matthew Demicco
(74) *Attorney, Agent, or Firm*—Fish & Neave; Laura A. Sheridan

(57) ABSTRACT

A system is provided in which contributors such as individuals in the home may create personal television channel programming. Personal television programs may be distributed to multiple viewers over a communications network such as the Internet. Personal television program schedule information may be stored in a database that is also used to store program schedule information for traditional television channels. Viewers may use a program guide or other interactive television application to view program schedule information, to set reminders, to set favorites, to establish parental controls, and perform other such functions. Links may be provided from displayed personal television channels to web sites, chat rooms, e-mail applications, and other such features.

112 Claims, 20 Drawing Sheets

| | 8:00 | 8:30 | 9:00 | 9:30 |
|---|---|---|---|---|
| TBS | PROGRAM 1 | | PROGRAM 2 | |
| CNN | PROGRAM 1 | PROGRAM 2 | | |
| MTV | PROGRAM 1 | | | |
| MED | PROGRAM 1 | | PROGRAM 2 | |
| DEN | PROGRAM 1 | PROGRAM 2 | | |
| FRA | PROGRAM 1 | | PROGRAM 2 | |
| HGT | PROGRAM 1 - ORDER NOW! | | | |
| CST | PROGRAM 1 - ORDER NOW! | | | |

*FIG. 10*

FIG. 14 ns in accordance with the present invention.

PERSONAL TELEVISION CHANNEL SYSTEM

This application claims the benefit of U.S. provisional application No. 60/152,537, filed Sep. 3, 1999.

BACKGROUND OF THE INVENTION

This invention relates to television systems, and more particularly, to television systems in which individual contributors may make their own videos available to viewers through a communications network such as the Internet.

Set-top boxes with cable modems are being developed. Set-top boxes are also being developed to which video cameras may be attached. If a hard disk is available with such a set-top box, a user may be able to store video content.

Hardware advances such as these make it possible to support new types of television programming.

It is therefore an object of the present invention to provide systems and methods that support the creation and distribution of videos programming created by individual contributors.

SUMMARY OF THE INVENTION

These and other objects of the invention are accomplished in accordance with the principles of the present invention by providing a system for distributing personal television channel programs from individual contributors to viewers over a communications network. Personal television programming may be distributed in real time or using a server so that the programming may be distributed on demand. Viewers may receive personal television channel programming through a television distribution facility such as a cable system headend or through an Internet service provider.

Personal television program schedule information may be provided to a data storage facility and stored with schedule information for traditional television channels. Viewers may access the schedule information and perform various functions, such as searching for programming of interest, establishing favorite programs, setting reminders, and setting parental controls. Links may be provided from displayed programs and schedule information to related web pages, chat rooms, etc. These features may be provided using an interactive television program guide or other interactive television application.

Contributors and viewers may use user equipment such as user television equipment (e.g., equipment based on a set-top box and television), user computer equipment (e.g., a personal computer or handheld computing device), or a cellular telephone. Video cameras may be used to capture video for the personal television programming.

Further features of the invention, its nature and various advantages will be more apparent from the accompanying drawings and the following detailed description of the preferred embodiments.

BRIEF DESCRIPTION OF THE DRAWINGS

FIG. 10 is an illustrative screen containing personal television program listings for personal television programs that may be ordered on demand in accordance with the present invention.

FIG. 14 is an illustrative television program guide display screen that may be provided by the system in accordance with the present invention.

DETAILED DESCRIPTION OF THE PREFERRED EMBODIMENTS

Figure 1:
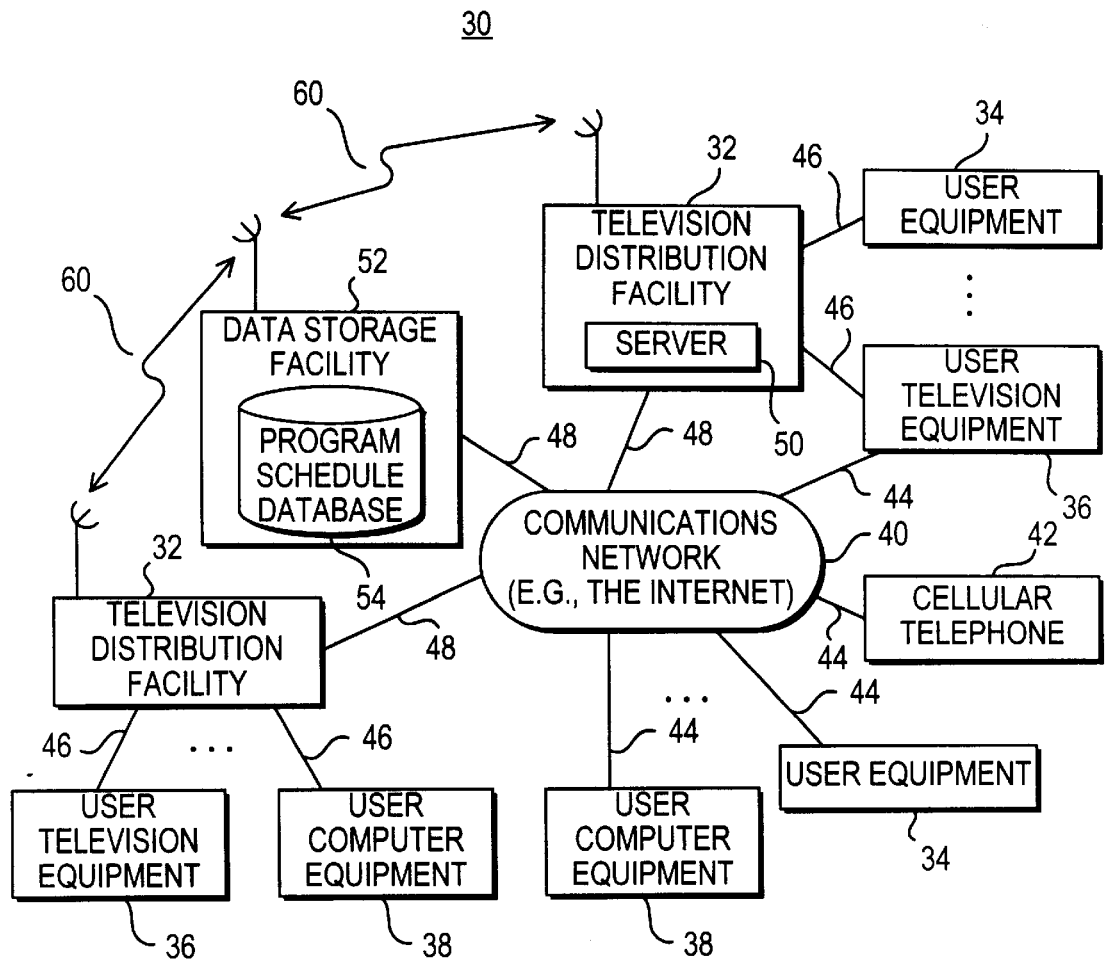
FIG. 1 is a diagram of an illustrative personal television channel system in accordance with the present invention.

An illustrative personal television program system 30 in accordance with the present invention is shown in FIG. 1. Television distribution facilities 32 may be used to distribute television programming to users at user equipment 34. Television distribution facilities 32 may be any suitable type of facility for distributing television, such as cable system headends, satellite transmission facilities, or broadcast facilities.

User equipment 34 may be, for example, user television equipment 36 or user computer equipment 38. User television equipment 36 may be a television, a set-top box connected to a television, an advanced television receiver such as a high-definition television, a Web TV box connected to a television, etc. User computer equipment 38 may be a personal computer, a personal computer television (PC/TV), a handheld computer, a notebook computer, a laptop computer, or other computing device. User equipment may also be connected directly to communications network 40 if desired. Communications network 40 may be the Internet. Communications network 40 may also involve network components based on the public telephone network, asynchronous transfer mode (ATM) networks or other packet-based networks, optical networks, wireless networks, a combination of such networks, or any other suitable communications network technology. For brevity and clarity, the present invention will often described in connection with situations in which communications network 40 is the Internet. User equipment 34 may be a cellular telephone 42 or other such portable wireless communications device.

An individual at home or at another suitable location may use user equipment 34 to create content for a personal television program or channel. For example, an individual may create programming for a personal television channel devoted to a particular hobby or interest of theirs. An individual may create programming on an off-beat topic or a topic not covered by the mainstream media. Other topics suitable for personal television channel programs include topics related to sports, theater, local events, school events, public meetings, music, education (e.g., lectures or courses), shopping, etc.

Viewers at user equipment 34 may be connected to the Internet via one of communications paths 44 or through one of television distribution facilities 32 using one of communications paths 46. Television distribution facilities 32 may be connected to the Internet using communications paths 48. Paths 44, 46, and 48 may include satellite paths, coaxial cable paths, fiber-optic paths, twisted-pair paths, other wire or cable-based links, wireless paths through free space, or any other suitable paths or combination of such paths. Communications over paths 44, 46, and 48 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions (e.g., MPEG-2 transmissions), etc. Some communications may involve wireless pager or other messaging transmissions. Communications paths 44, 46, and 48 may include cable connected to cable modems, digital subscriber lines, integrated services digital network (ISDN) lines, or any other suitable paths.

As an example, a viewer or contributor with a set-top box or computer that has a cable modem may be connected to the Internet via an associated cable system headend using one of paths 46. A viewer or a contributor with a cellular telephone or other portable wireless device with display or video capture capabilities may be connected to the Internet via a wireless link over one of paths 44. Viewers or contributors with set-top boxes or computers may also have modem circuitry that supports connections to the Internet using non-cable paths such as telephone lines or DSL lines. If desired, videos may be provided to user equipment 34 over digital video channels. For example, MPEG videos may be provided over a portion of an analog television channel that supports such a digital video channel. Videos may also be transmitted from user equipment 34 using digital video channels (e.g., if the communications path connected to user equipment 34 is a cable link, MPEG videos may be transmitted over that link as a digital data stream).

If desired, the format in which the video material of a contributor is distributed may be changed during the distribution process. For example, a contributor may submit a video for a personal television program to a server (e.g., a server such as server 50 at a television distribution facility 32) using a cable modem Internet link. Server 50 may redistribute the video to viewers associated with the television distribution facility 32 over digital video channels using MPEG techniques. This example is merely illustrative. The format of personal television channel video may be changed at any stage in the process between creation of the video by the contributor and viewing of the video by viewers using any suitable conversion techniques.

Figure 2:
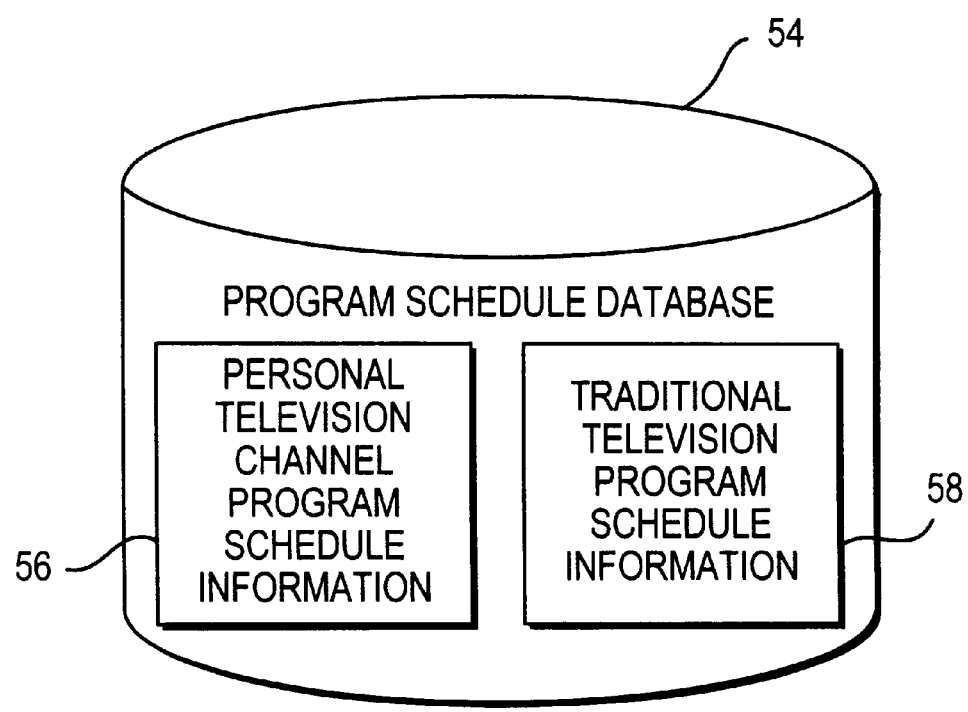
FIG. 2 is a diagram of an illustrative program schedule database in accordance with the present invention.

A data storage facility 52 may be used to supply data such as program schedule data and other such information. This information may be stored in a program schedule database such as program schedule database 54. As shown in FIG. 2, program schedule database 54 may include program schedule information 56 for personal television channels and program schedule information 58 for traditional television channels (e.g., ABC, NBC, TBS, MTV, etc.). Schedule information may include scheduled broadcast times, channels, channel logos, channel descriptions, program titles, program descriptions, genre or category information classifying the content of the program, ratings (TV-Y, PG-13, etc.), star ratings (one star, two stars, etc.), reviews, information on the talent associated with the program (e.g., actors, directors, etc.), running time information, pricing information (for programs that are available for a fee), viewer password information (for personal television channels or programming that are not to be made universally available), etc. These are merely illustrative examples. Any other suitable information related to programming may be included in the personal television channel program schedule information and the traditional television channel program schedule information if desired.

Program schedule information may be distributed to television distribution facilities 32 from data storage facility 52 using satellite links 60 (FIG. 1) or other suitable communications paths. Using satellite links allow large volumes of program schedule data to be simultaneously transmitted on a nationwide basis to numerous television distribution facilities 32. Television distribution facilities 32 may distribute program schedule information to users at associated user equipment 34 using communications paths 46 (e.g., over an out-of-band channel, in a digital data stream on an analog television channel carrier, in the vertical blanking interval, etc.). If desired, data storage facility 52 may distribute schedule information using over a large geographic area (e.g., nationwide). Each television distribution facility in the area (e.g., in the nation) that receives the information may filter out the portion of the information that is relevant for that television distribution facility's local service region.

Schedule information may be distributed to user equipment 34 from data storage facility 52 over communications network 40. The data storage functions of data storage facility 52 may be performed by one or more servers that may be located at one or more geographically distinct locations. Some of the data (e.g., all or part of the personal television channel program schedule information or the traditional television channel program schedule information) may be distributed in real time without storage.

Data distribution may involve using continuous streams of data, periodic data distribution schemes (e.g., once per hour or once per day), on-demand data distribution schemes (e.g., client-server or distributed architectures), any other suitable schemes, or combinations of such schemes.

The traditional television channel information in program schedule database 54 may be gathered from broadcast and cable networks (either directly or through a third party data source). A data collection application may be used to facilitate the collection of schedule data for personal television channel programming from the contributors or creators of such programming. For example, a web page or other interface may be used by contributors to enter personal television channel schedule information over the Internet.

Figure 3:
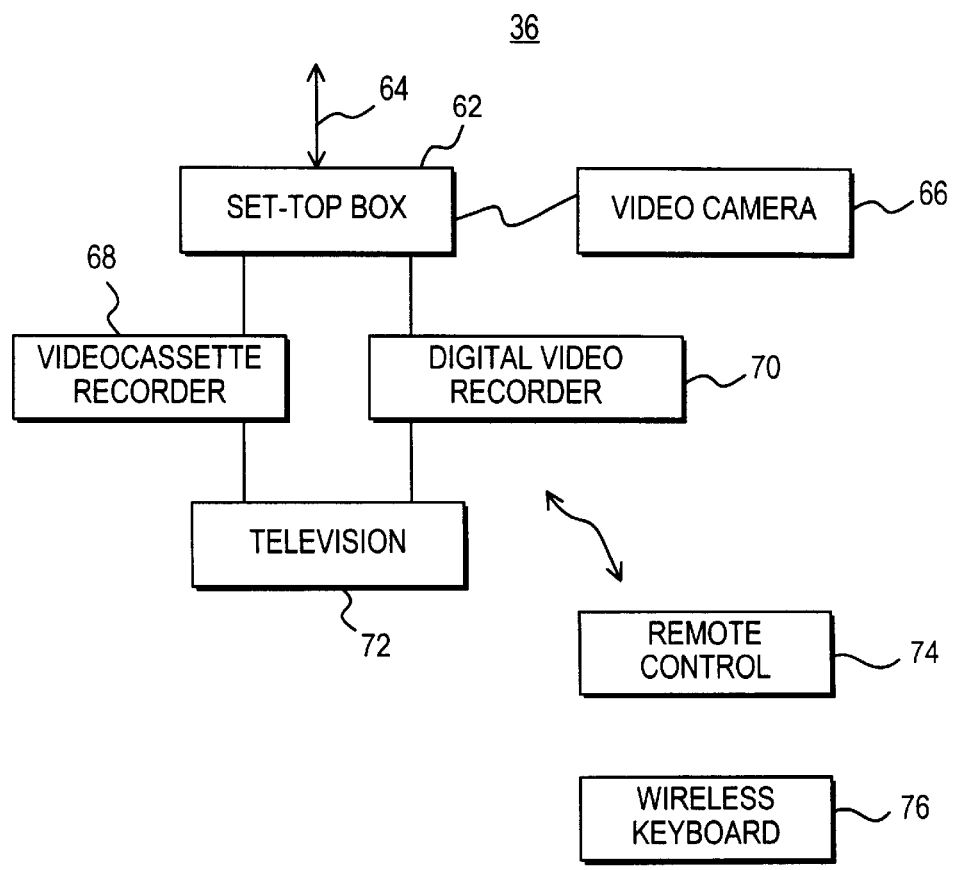
FIG. 3 is a diagram of illustrative user television equipment in accordance with the present invention.

Various types of user equipment may be used by contributors to create video programming for personal television channels. Illustrative user television equipment 36 is shown in FIG. 3. A microprocessor-based set-top box 62 may receive and transmit video programming and data via connection 64. Connection 64 may be connected to a communications link such as communications links 44 and 46 of FIG. 1.

Video camera 66 may be used to capture video programming for a personal television channel. Video camera 66 may be separate from set-top box 62 or may be constructed as a part of set-top box 62. Video camera 66 may be a standard video camera that records onto a videocassette tape or other suitable storage medium for subsequent playback or may be a video camera without storage capabilities. Video may be provided to set-top box 62 from video camera 66 in real time as a live video is being created or may be provided by playing back a recorded video. Set-top box 62 may provide the video to viewers in real time or may play back the video from a suitable storage device. Suitable storage devices that may be included in set-top box 62 include memory circuits, hard disk drives, digital video disks, compact disks, etc. Storage capacity may also be obtained using external devices. For example, a videocassette recorder 68 may be used for external storage. A personal video recorder or digital video recorder 70 may be used for external storage or may be used to perform the functions of set-top box 62. Digital video recorder 70 may record and play back video using MPEG techniques.

A television 72 or other suitable monitor may be used to display television programming including programming from traditional television channels and programming from personal television channels. A remote control such as remote control 74 may be used to control the components of user television equipment 36. Remote control 74 may be a standard infrared remote control with arrow keys, an enter, select or OK key, numeric keys, channel up and down keys, volume control keys, an info or star (*) key, a menu key, etc. Other user input devices may also be used to supply information or commands to the components of user television equipment 36. For example, a wireless keyboard 76 may be used to supply information. The user input device may also be a voice recognition device, a pointing device such as a mouse or trackball, a touch pad, a touch screen, a handwriting recognition device, etc.

Figure 4:
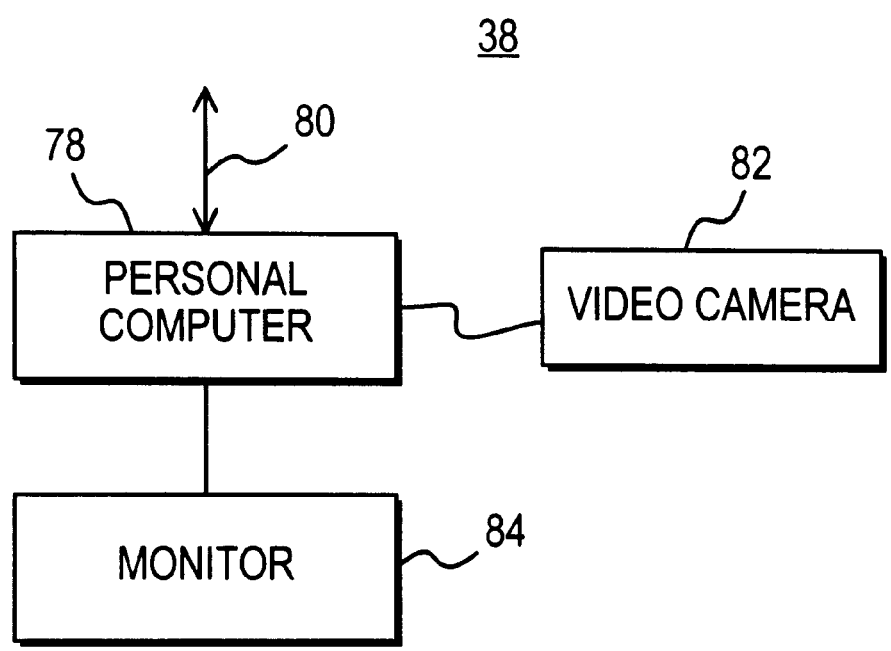
FIG. 4 is a diagram of illustrative user computer equipment in accordance with the present invention.

If desired, user equipment 34 (FIG. 1) may be user computer equipment 38 (FIG. 1). Illustrative user computer equipment 38 is shown in FIG. 4. A personal computer or other suitable computing device 78 may receive and transmit video programming and data via connection 80. Connection 80 may be connected to a communications link such as communications links 44 or 46 of FIG. 1.

Video camera 82 may be used to capture video programming for a personal television channel. Video camera 82 may be separate from personal computer 78 or may be constructed as a part of personal computer 78. Video camera 82 may be a standard video camera that records onto a videocassette tape or other suitable storage medium for subsequent playback or may be a video camera without its own storage capabilities. Video may be provided to personal computer 78 from video camera 82 in real time as a live video is being created or may be provided by playing back a recorded video. Personal computer 78 may distribute the video to viewers in real time or may play back the video from a suitable storage device. Suitable storage devices that may be included in personal computer 78 include memory circuits, hard disk drives, digital video disks, compact disks, etc. Storage capacity may also be obtained using external devices such as tape drives, compact disk or digital video disk jukebox systems, etc. A monitor 84 may be used to display videos and other information. Personal computer 78 typically includes a keyboard and may include a voice recognition device, a pointing device such as a mouse or trackball, a touch pad, a touch screen, a handwriting recognition device, or any other suitable user input device.

Figure 5:
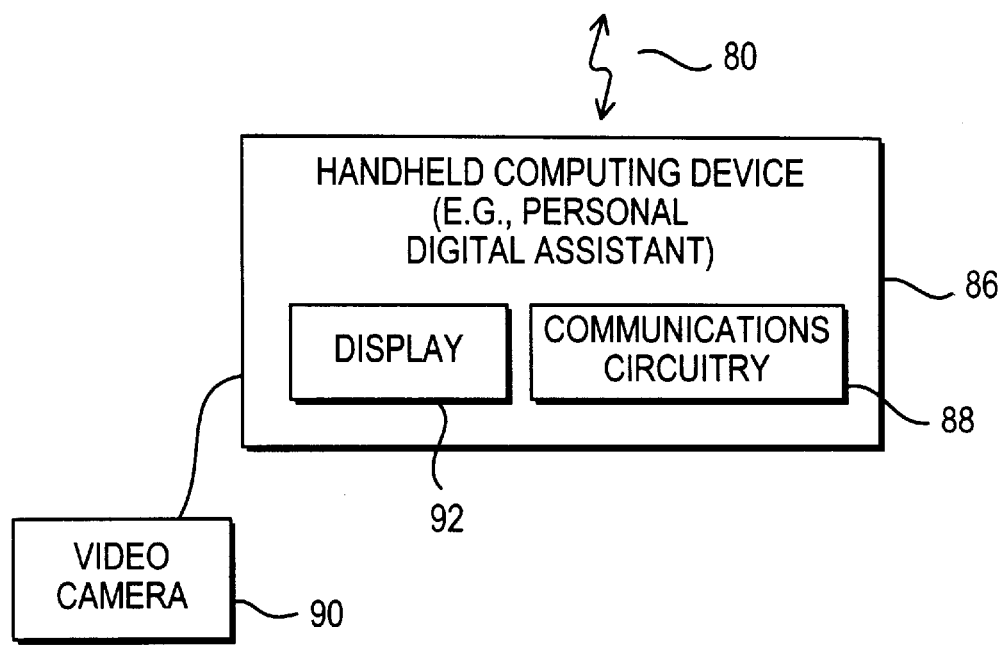
FIG. 5 is a diagram of illustrative handheld computing equipment in accordance with the present invention.

If desired, user computer equipment 36 (FIG. 1) may be based on a handheld computing device such as handheld computing device 86 of FIG. 5. Handheld computing device 86 may be a personal digital assistant (PDA) or other small portable computing device. Handheld computing device 86 may receive and transmit video programming and data via connection 80. Connection 80 may be connected to a communications link such as one of links 44 or 46, which may be a wireless communications link.

Communications circuitry 88 supports communications functions. For example, handheld computing device 86 may have communications circuitry 88 that supports wireless communications, so that handheld computing device 86 may be connected to a wireless link. Communications circuitry 88 may also be based on modem circuitry for communicating over a telephone line, cable link, DSL link, etc. or may be based on any other suitable type of communications circuitry.

Video camera 90 may be used to capture video programming for a personal television channel. Video camera 90 may be separate from handheld computing device 86 or may be constructed as a part of handheld computing device 86. Video camera 90 may be a standard video camera that records onto a videocassette tape or other suitable storage medium for subsequent playback or may be a video camera without storage capabilities. Video may be provided to handheld computing device 86 from video camera 90 in real time as a live video is being created or may be provided by playing back a recorded video. Handheld computing device 86 may distribute the video to viewers in real time or may play back the video from a suitable storage device (e.g., a memory or other storage device in handheld computing device 86 or external to handheld computing device 86).

Handheld computing device 86 may have a display 92 that is build into handheld computing device 86 or that is external to handheld computing device 86. The display may be touch sensitive, so that the user may interact with the items displayed on the display. For example, a user's input may be recognized using a pen and handwriting recognition software or may be recognized because the user touches the touch screen. Handheld computing device may also have keys that allow the user to interact with prompts provided on display 92.

Figure 6:
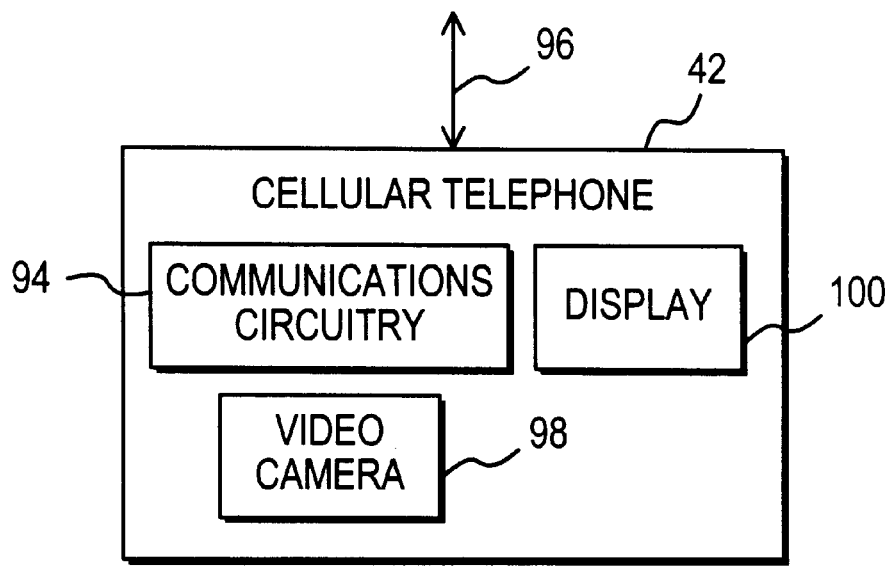
FIG. 6 is a diagram of illustrative cellular telephone equipment in accordance with the present invention.

Another type of user equipment that may be used in system 30 is the cellular telephone. As shown in FIG. 6, cellular telephone 42 may communicate with system 30 using communications circuitry 94 to form a link over connection 96.

Video camera 98 may be used to capture video programming for a personal television channel. Video camera 98 may be separate from cellular telephone 42 or may be constructed as a part of cellular telephone 42. If constructed as part of cellular telephone 42, video camera 98 is preferably a small and lightweight video camera. If connected externally, video camera 98 may be a standard video camera that records onto a videocassette tape or other suitable storage medium for subsequent playback. Video may be provided to cellular telephone 42 by video camera 98 in real time as a live video is being created or may be provided by playing back a recorded video. Cellular telephone 42 may distribute the video to viewers in real time via connection 96.

Cellular telephone 42 may have a display 100. The display may be touch sensitive, so that the user may interact with the items displayed on the display. For example, a user's input may be recognized using a pen and handwriting recognition software or may be recognized when the user touches the touch screen. Cellular telephone 42 may also have keys (e.g., navigation keys, and numeric keys, and other keys) that allow the user to interact with prompts provided on display 100.

Figure 7:
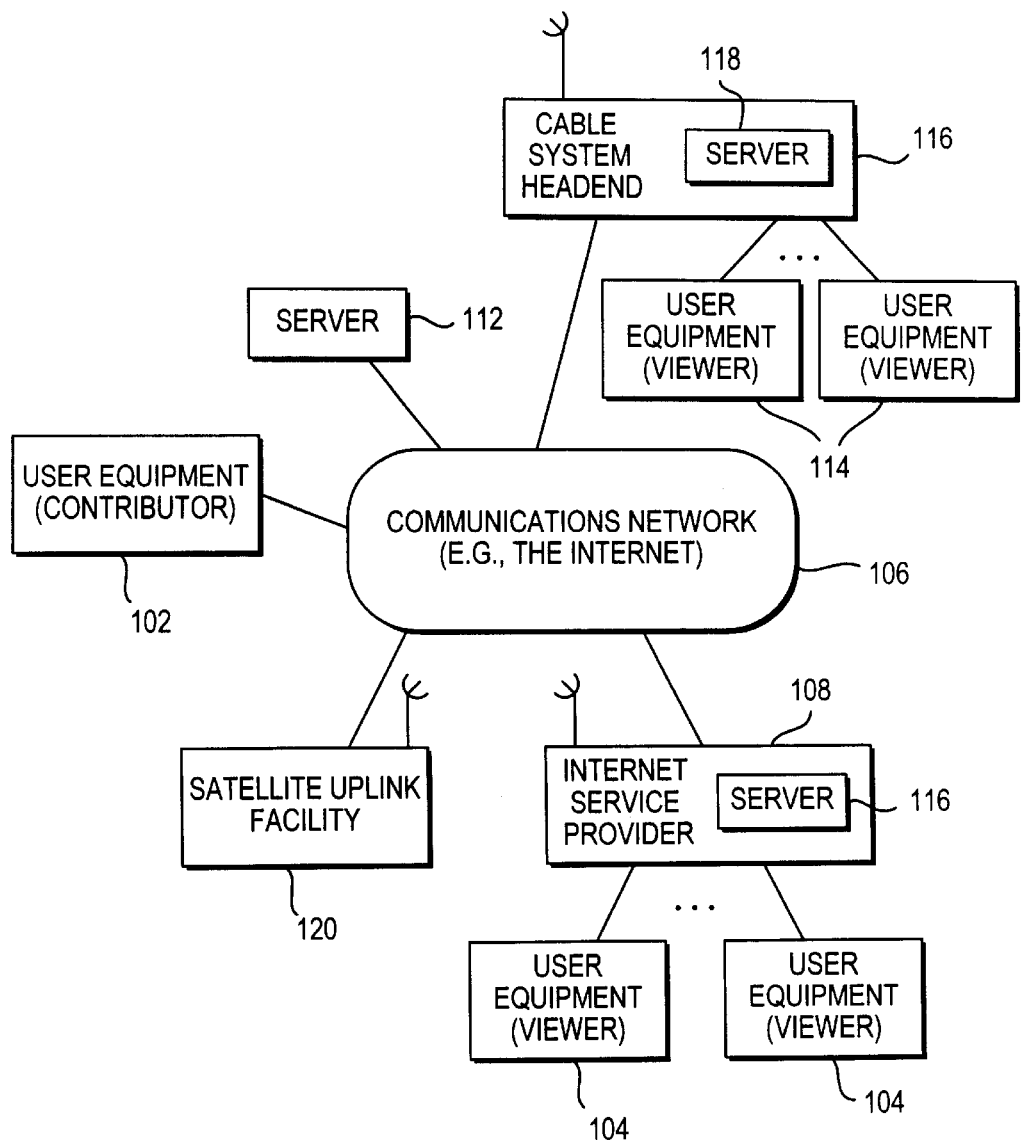
FIG. 7 is a diagram showing illustrative system components in accordance with the present invention.

The user equipment from which contributors distribute videos may be referred to as contributor equipment and the user equipment at which videos are received and viewed by viewers may be referred to as viewer equipment. Personal television channel videos may be distributed from the contributor equipment to the viewer equipment using various techniques. As shown in FIG. 7, for example, a video created by a contributor at user equipment 102 may be distributed to viewers at receiving user equipment 104 via communications network 106 and Internet service provider (ISP) 108. Videos may be distributed this way in real time.

If desired, videos may initially be distributed by transmitting them to computer equipment such as a server 110 located at Internet service provider 108 or a server 112 located at any suitable location connected to communications network 106. The videos may be then be redistributed from the server to the viewer. For example, videos may be redistributed from the server on demand when requested by the viewer or may be redistributed according to a schedule. The schedule may be established by the operator of the server, by the contributor, or by any other suitable party.

Videos may be distributed from user equipment 102 to user equipment 114 through communications network 106 and cable system headend 116. Videos may be distributed in real time. If desired, a server 118 at cable system headend 116 (or at a network node in the same cable system) may be used to cache or otherwise store the videos for redistribution to user equipment 114. Server 112 may also be used to cache or otherwise store the videos for redistribution to user equipment 114.

Servers such as server 110, 112, and 118 may be based on single computers or may be based on clusters or groups of computers. Regardless of the particular arrangement that is used, such computer systems are referred to herein as servers. Servers such as servers 110, 112, and 118 may be used in combination with each other if desired.

A satellite uplink facility such as satellite uplink facility 120 may be used to simultaneously distribute personalized television channel videos to multiple Internet service providers such as Internet service provider 108 in parallel. The Internet service providers may each store the videos in a server such as server 110. Viewers associated with the Internet service providers may request the videos from the associated server.

Satellite uplink facility 120 may also be used to simultaneously distribute personalized television channel videos to multiple cable system headends such as cable system headend 116. The videos distributed by satellite uplink facility 120 may be simultaneously distributed to both cable system headends and Internet service providers in parallel. If desired, the equipment of an Internet service provider may be located at a cable system headend. Schedule data may be distributed at the same time that personal television channel videos are being distributed or may be distributed at a different time. Schedule data may accompany the videos or use the same distribution path as the videos or may be distributed using its own data path.

Figure 8:
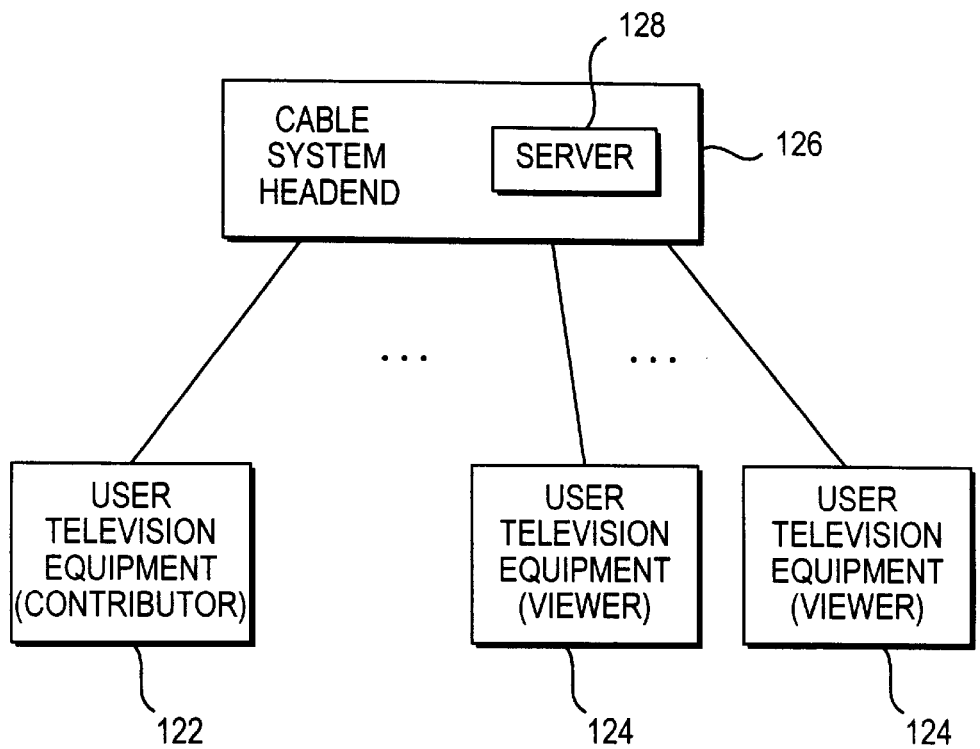
FIG. 8 is a diagram showing an illustrative system arrangement based on a cable system headend in accordance with the present invention.

As shown in FIG. 8, a contributor at user television equipment 122 may distribute personal television channel programming to viewers at user television equipment 124 that is connected to the same cable system headend 126. With this type of system, contributors may upload videos to a server such as server 128. Server 128 may be used to cache or otherwise store the videos. Stored videos may be retrieved by viewers on demand. Videos may also be distributed from the contributor to the viewers in real time.

As an example, which is merely illustrative, a contributor may transmit a video for a personal television channel to server 128 using a cable modem and a communications scheme such as an Internet-based scheme. The server may store the video until requested or until a scheduled broadcast time. The video may be distributed on an analog television channel or may be distributed by converting the video into an MPEG stream and transmitting it on a digital channel (e.g., a digital data stream carried on an analog television channel carrier).

Viewers may be provided with schedule information for conventional television programs and personal television channel programs using any suitable technique. One approach involves using a passive television channel to make the schedule information available. Viewers with televisions may be provided with a list of program listings on a dedicated television channel. A computer located at the viewer's cable system headend may be used to convert program schedule data into a scrolling or paged display with text and graphics that is transmitted to the viewers over the dedicated channel. The schedule data may be supplied to the cable system headends (or other television distribution facilities) from data storage facility 52 (FIG. 1).

Another approach involves using an interactive television program guide to access the schedule information. An interactive television program guide may be implemented using software that runs locally on user equipment 34 or may be implemented using a client-server architecture or distributed approach in which a program guide server process running on a server or servers is accessed by a client process running on client equipment. The interactive television program guide may be implemented on user television equipment 36. For example, the program guide may be implemented using a set-top box. The program guide may also be implemented on user computer equipment 38. For example, a web browser may be used to access an on-line program guide web site. Cellular telephone 42 may also be used to support a program guide. Program listings and (if desired) selectable options may be displayed on display 100 (FIG. 6). The user of cellular telephone 42 may interact with the displayed items using buttons on the telephone.

Figure 9:
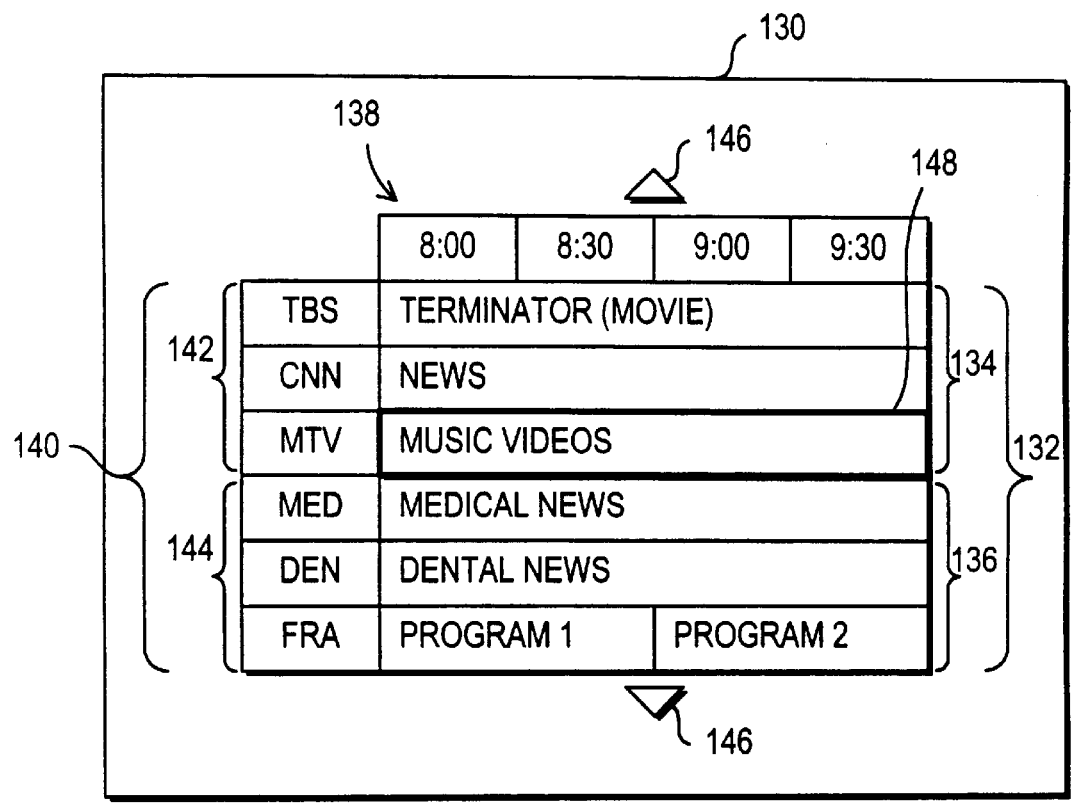
FIG. 9 is an illustrative screen containing program schedule information for both traditional television channels and personal television channels that may be provided to viewers in accordance with the present invention.

Regardless of the particular type of interactive television program guide that is used, a viewer that is interested in browsing program listings and the like may (if desired) use the program guide to obtain schedule information on both traditional television programs and personal television programs. An illustrative example of a display screen 130 that may be displayed by an interactive television program guide is shown in FIG. 9. Screen 130 may be displayed, e.g., on television 72 (FIG. 3) if the user equipment is user television equipment, may be displayed on monitor 84 (FIG. 4) if the user equipment is user computer equipment, may be displayed on display 92 (FIG. 5) if the user equipment is a handheld computing device, and may be displayed on display 100 (FIG. 6) if the user equipment is a cellular telephone.

Screen 130 may include a list of program titles 132 that includes program title information 134 for traditional television channels and program title information 136 for personal television channel programs. The list may be presented in the form of a grid of programs organized by scheduled broadcast times 138 and channels 140 or may be presented in any other suitable format. In the example of FIG. 9, the traditional television channel title information 134 and the personal television channel title information 136 are grouped separately. If desired, however, these two types of information may be interspersed with each other.

The channel information 140 that is associated with the title information 132 may include traditional television channel information 142 for each of the traditional television channels and personal television channel information 144 for each of the personal television channels.

Arrows 146 indicate that the user may scroll the list of program titles using a suitable user interface (e.g., remote control up and down arrow keys for user equipment based on a set-top-box). A movable highlight region 148 may be used. Highlight region 148 may be positioned using the user interface (e.g., the remote control up and down arrow keys for a set-top box). When the viewer reaches the top or bottom of the list, subsequent actuation of an up or down arrow key may cause the list to scroll by one or more rows or to page to the next screen. Viewers may select programming of interest by highlighting the program titles and channels for the desired programming and pressing a remote control select or enter or OK key. Viewers using other types of user equipment may use the user interface appropriate for that type of equipment to interact with the displayed program schedule information.

For clarity, the illustrative examples discussed herein are often described in the context of interactive television applications and particularly interactive television program guides that are based on set-top boxes or other user television equipment. However, the features described in connection with program guides and user television equipment may be used in connection with other interactive television applications and user computer equipment or cellular telephone equipment if desired. The user interfaces used by the user to supply commands to the interactive television applications and the types of display used to display information for the user may vary between the different hardware platforms that are used.

If desired, selecting a program of interest with a program guide may direct the program guide to tune the set-top box to the appropriate channel for the selected program. For example, if the viewer highlights Dental News on screen 130 of FIG. 9, the set-top box supporting the program guide may tune to channel DEN and display the personal television program Dental News on the viewer's television.

If the viewer highlights program 2 on personal television channel FRA, and the current time is only 8:00, the program guide may display a message indicating that the personal television program is not available until 9:00. The viewer may then be provided with an opportunity to set a reminder for the program. Just before the scheduled broadcast time of the program, a reminder message may be displayed for the viewer.

Some personal television channel programming may be available on demand, rather than just at a scheduled broadcast time. An illustrative screen 150 that may be used to display such programming is shown in FIG. 10. The personal television channel programs associated with program listings 152 and 154 may be requested at any time by the viewer, as indicated by the "order now" prompt that is included with the title.

The viewer may use highlight region 155 to select a desired program. Pressing a remote control OK key may direct the program guide to request the desired program from the server or other equipment on which the program is stored. The selected program may, for example, have been stored on a server such as server 50 (FIG. 1) at a television distribution facility 32 associated with the viewer, a server such as server 112 (FIG. 7) that is located on the Internet or otherwise connected to a communications network such as communications network 106, a server such as server 110 (FIG. 7) that is located at an Internet service provider (108) that is associated with the viewer, or a server or storage equipment at the contributor's location. After processing the request, the system may deliver the requested program to the viewer over communications paths such as communications paths 44 and 46 (FIG. 1).

Figure 11:
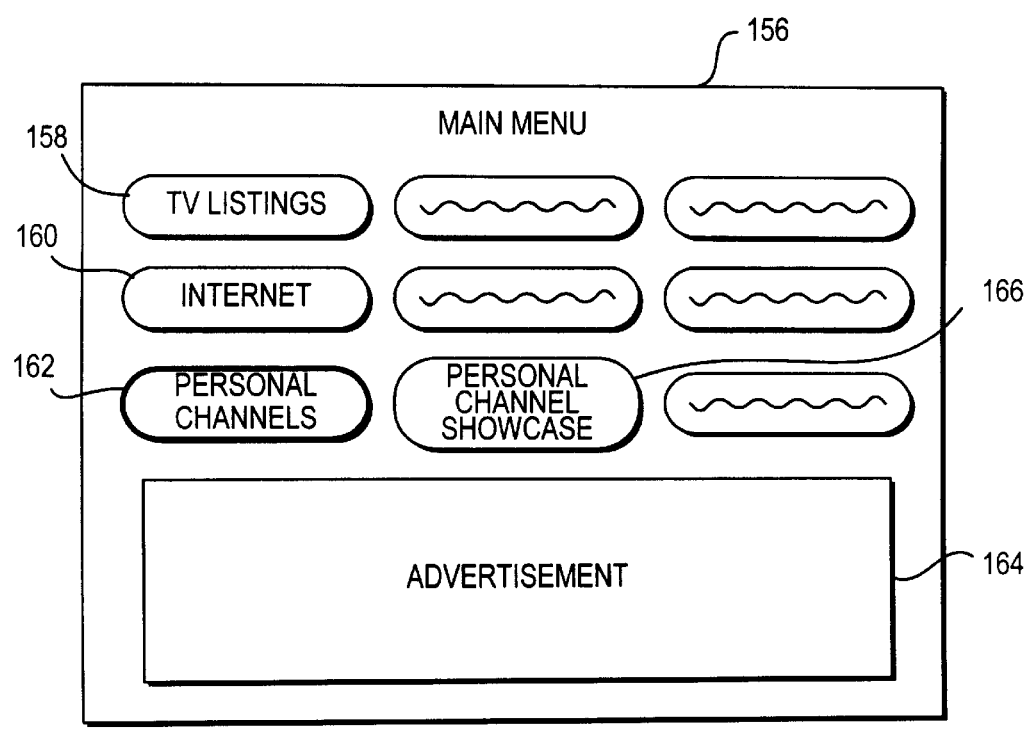
FIG. 11 is an illustrative menu that contains options allowing a viewer to view information on traditional television listings, Internet content, and personal television channels in accordance with the present invention.

The program guide may allow the user to access information using various selectable options. An illustrative menu screen 156 that may be displayed by the program guide is shown in FIG. 11. Option 158 may provide the user with an opportunity to view television program schedule information for traditional television channels. Option 160 may launch a web browser or other suitable software that allows the user to browse the Internet. Personal channels option 162 may provide the user with an opportunity to view program schedule information for personal television channel programming.

An interactive advertisement 164 may be provided. If the user selects advertisement 164, the program guide may display information on the advertised product or may provide the user with options that allow the user to electronically order the advertised product.

Figure 12:
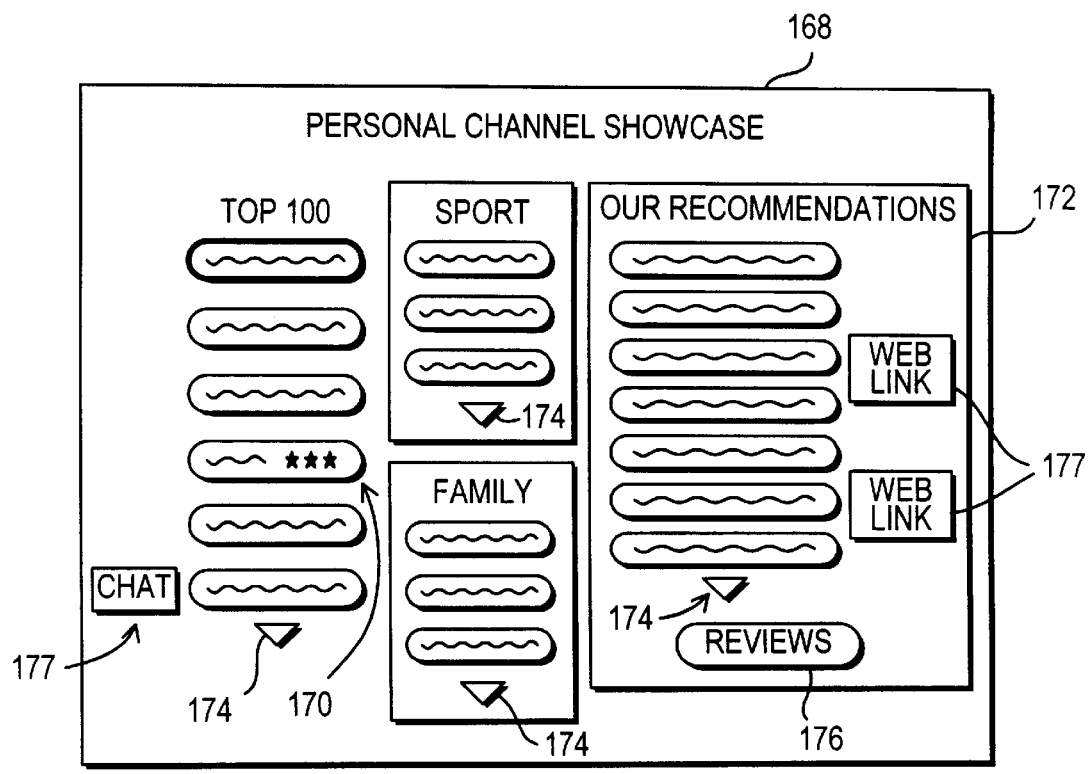
FIG. 12 is an illustrative personal television channel showcase screen that may be provided to viewers in accordance with the present invention.

If the user selects personal television channel showcase option 166, the program guide may display a screen such as personal channel showcase screen 168 of FIG. 12. Showcase screen 168 may contain information on the top 100 personal television channels. Ratings for the top 100 personal television channels may be obtained by monitoring which personal television channel programs are most often viewed. The monitoring process may involve logging requests to the servers on which the personal television programs are stored or may involve monitoring requests from the viewer's location.

Personal television program information that is displayed on screen 168 and any other suitable display screens may contain star ratings 170 (indicating a critic's opinion of a program). Certain recommendations may also be made by the provider of screen 168 or by a critic. For example, a region of screen 168 such as our recommendations region 172 may be used to showcase recommended programming.

Programming may also be grouped by category (e.g., all programming related to sports or to family issues, etc.) A user may scroll through the listings provided in such regions, as indicated by arrows 174. Reviews of certain personal television channel programming may be obtained by selecting reviews option 176.

Selectable links may be associated with the listed personal television programs. For example, links 177 may be provided. When links 177 are selected, the program guide may launch a web browser and direct the user to an associated web site or may launch a chat application to provide the user with an opportunity to join a chat related to a particular program, etc.

Figure 13:
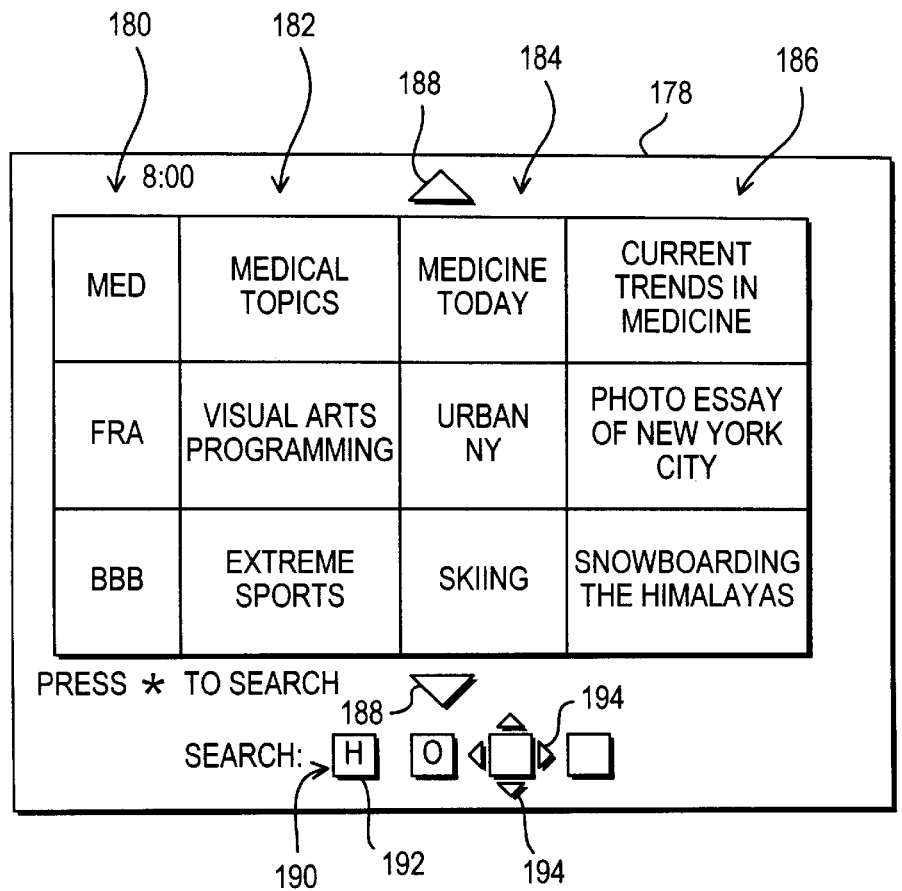
FIG. 13 is an illustrative screen that contains personal television channel description information for viewers in accordance with the present invention.

If the user selects personal channels option 162 of FIG. 11, the program guide may display a screen of program listings that are all for personal television channel programs, as shown in FIG. 13. Screen 178 of FIG. 13 may include call letter or station identification information 180. Personal television channel description information 182 that describes each personal television channel may also be included. In addition, screen 178 may contain information 184 on the title of the current program on each channel and description information 186 for each of these programs. Arrows 188 indicate that the user may scroll to view other channels of interest.

Another way in which to find information is using a search feature. A search feature 190 may be provided at various locations in a program guide, but is shown on personal television channel screen 178 of FIG. 13 as an example. The search feature 190 of FIG. 13 may be accessed by pressing a star (*) key or other remote control button. The search feature allows the user to enter letters into boxes 192. Up and down arrows may be used to select desired letters. A right arrow may be used to advance to the next box 192 when finished. The back arrow may be used to edit a previous box. These functions are indicated by arrows 194. Pressing an OK button may initiate the desired search.

If desired, an on-screen keyboard may be used to enter letters. Platforms that support keyboards allow the user to enter information using alphanumeric keys. Platforms may also accept titles for searching based on voice commands, pen-commands, commands entered using a touch-sensitive screen, commands from remote control devices, cellular telephone keypads, etc.

Figure 14:
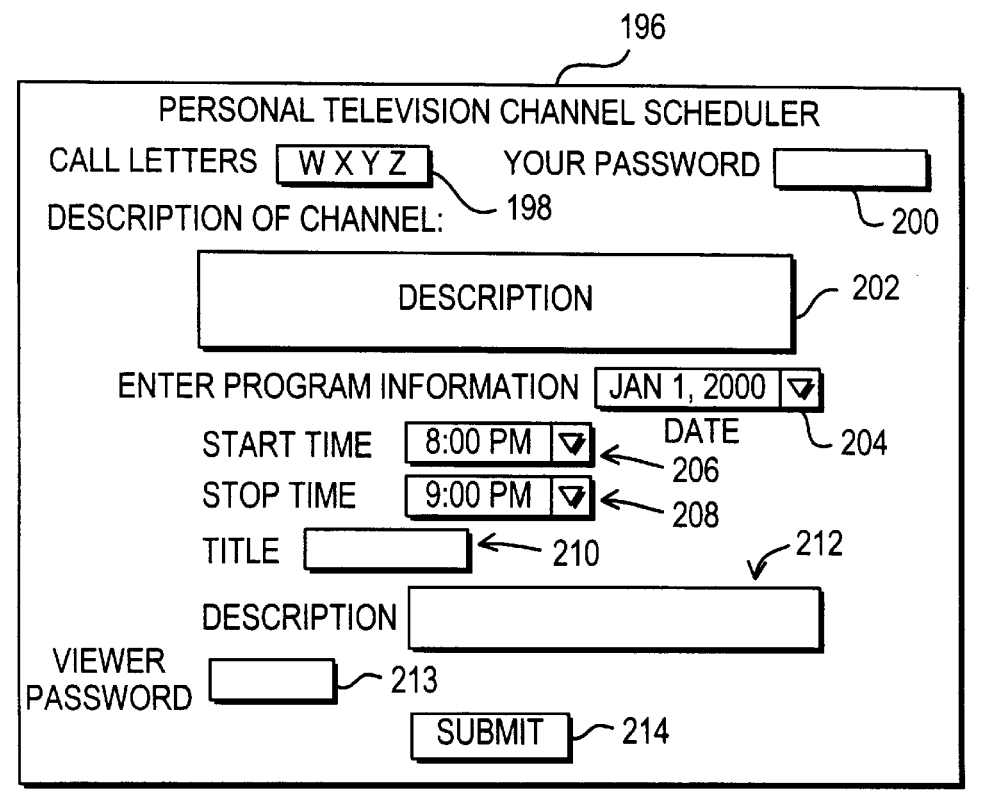

A contributor may set up a schedule for the personal televison channel programming that the contributor has created. A suitable schedule information input screen 196 that may be provided for the user is shown in FIG. 14. An option 198 may be provided to allow the contributor to enter the call letters of the contributor's personal television channel.

Option 200 may be used to provide the contributor with an opportunity to enter a password. The password may be used to ensure that only the contributor is able to modify the data associated with the contributor's personal television channel. Screen 196 may be provided over the Internet if desired. Description region 202 may be used to provide an opportunity for the contributor to add a description of personal television channel. Options may also be provided (e.g., on a separate screen) that allow the contributor to specify the location of the programming to be uploaded or provided in real time, to specify which communications paths the programming is to use, etc.

Option 204 of screen 196 may be used by the contributor to establish the scheduled date on which the program is to be shown or to indicate that the program is available on demand. Options 206 and 208 may be used to establish the starting and ending times for a scheduled program. The title of the program may be entered using option 210. Option 212 allows the contributor to add a description for the program. Option 213 may be used to establish a viewer password. The system may only allow those viewers who supply this password (e.g., to a program guide) to view the program. The contributor may submit the information on screen 196 by selecting submit option 214. Scheduling information gathered using screen 196 may be stored in data storage facility 52. If desired, screen 196 may be provided to the contributor from a server running at data storage facility 52 that is accessed by the contributor over the Internet. Screen 196 may be, for example, a web page that the contributor may access from a set-top box browser or a computer browser, etc.

Figure 15:
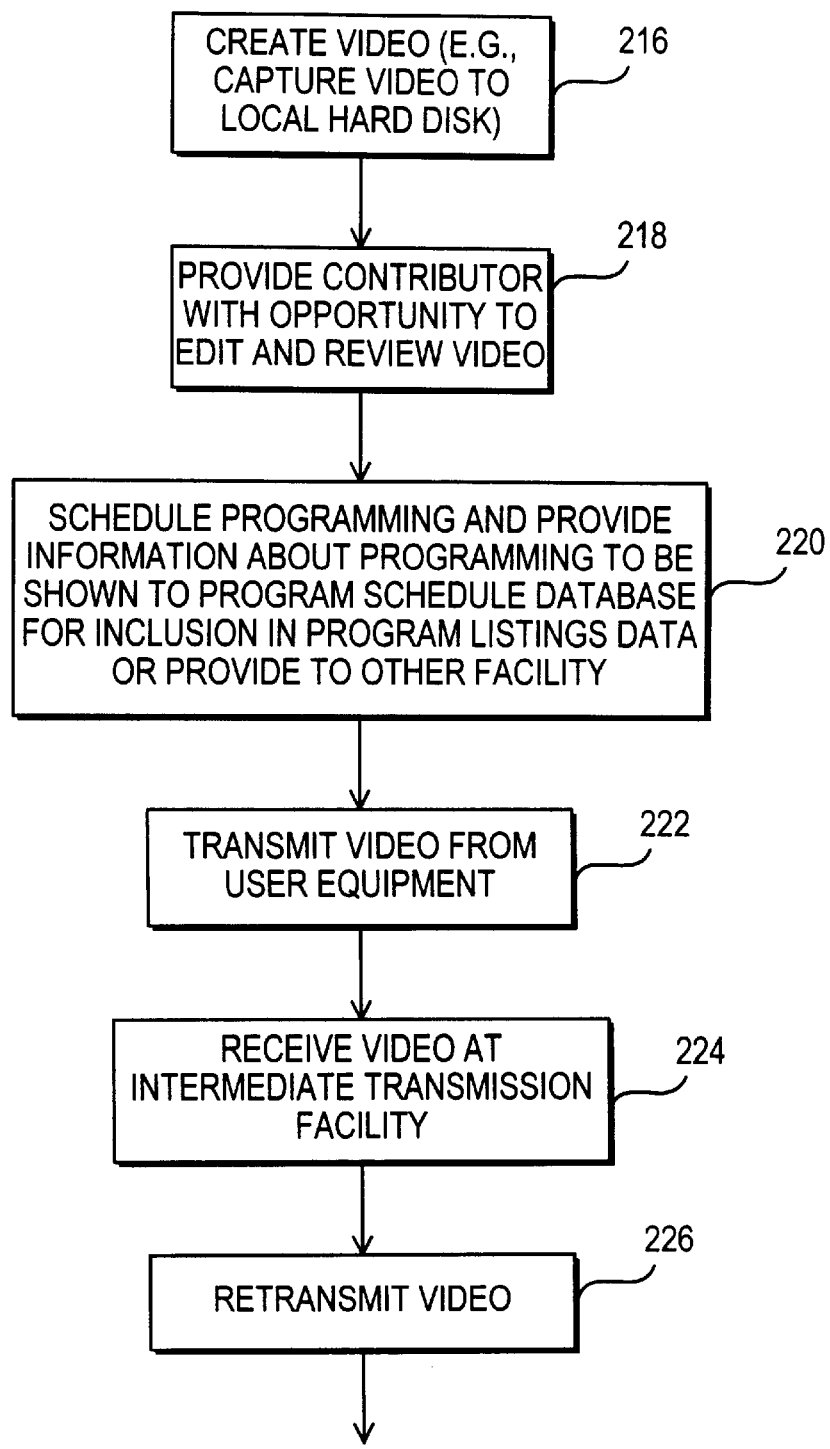
FIG. 15 is a flow chart of illustrative steps involved in using the system to provide personal television channel programming in accordance with the present invention.

Illustrative steps involved in using system 30 (FIG. 1) to provide personal television channel programming are shown in FIG. 15. At step 216, a contributor may create video for personal television channel programming. Video may be captured for distribution in real time or may be captured to a hard disk for editing. Video may be recorded onto a tape or other suitable media. If desired, the contributor may edit a video recording at step 218. Capturing and editing software may be implemented on user equipment 34.

At step 220, the contributor may schedule personal television channel programming and may provide schedule information to a program schedule database. The schedule information that is provided may include category information (e.g., information on the genre of the personal television channel programming—sports, comedy, news, etc.), ratings information (e.g., parental control ratings, star or critics ratings, etc.), and information on web links associated with the personal television channel programming. The contributor may provide schedule information to data storage facility 52 using a personal television channel scheduler of the type illustrated in FIG. 14. The schedule information may be stored in a program schedule database with traditional television channel schedule information as shown in FIG. 2 if desired. The video for the personal television channel programming may be transmitted from user equipment 34 at step 222. The video may be transmitted in real time or may be played back from a suitable storage device. If desired, the video may be received at an intermediate transmission facility (e.g., one of the servers) at step 224 and retransmitted at step 226. Step 226 may be performed, for example, when requested by a viewer or at a scheduled broadcast time. Scheduled broadcast times from the intermediate transmission facility may be determined at step 222 by agreement between the contributor and the operator of the intermediate transmission facility. The operator may, e.g., make a certain number of broadcast times available to contributors on a first-come-first-served basis. Once the contributor has been assigned a time slot, the contributor (or the operator of the intermediate facility) may provide appropriate schedule information to data storage facility 52 at step 220.

Figure 16:
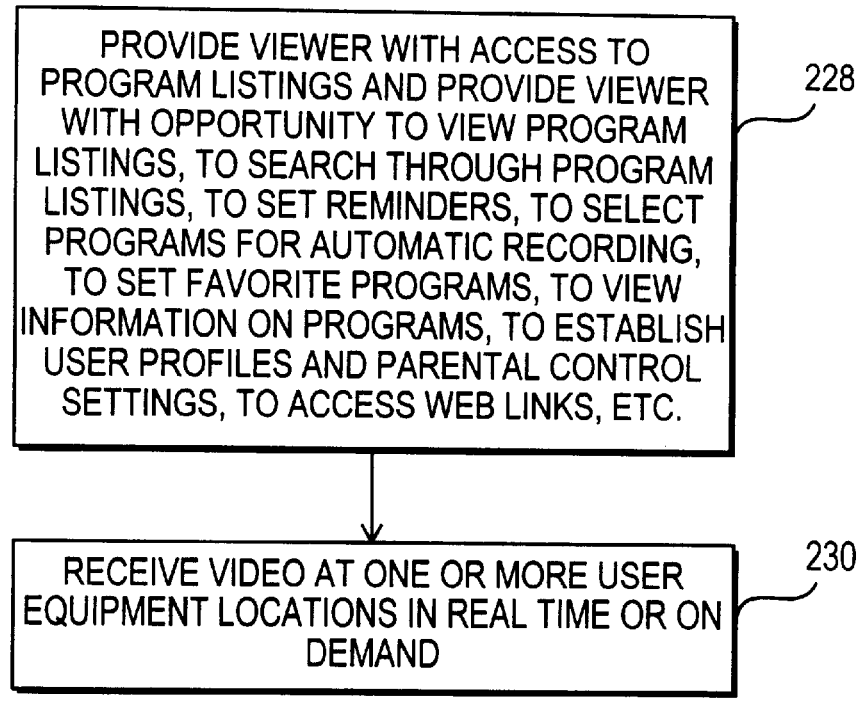
FIG. 16 is a flow chart of illustrative steps involved when a viewer accesses schedule information and receives programming in accordance with the present invention.

Steps involved in using the personal television channel schedule information and viewing personal television channel programs and the like are shown in FIG. 16. At step 228, the viewer may be provided with access to program schedule information that includes traditional television channel schedule information and personal television channel schedule information. A program guide or other interactive television application may be used to provide the viewer with access to the schedule information. A web browser may be used to access the schedule information if desired. When accessing the schedule information, the viewer may be provided with an opportunity to view program listings and to search through program listings for programming of interest. The user may set reminders for certain programs. The reminders may be, for example, pop-up overlays on the viewer's television screen, e-mail reminders, or reminders in the form of telephone calls or paging messages placed to the viewer's cellular telephone just before the desired personal television channel program is scheduled to air. The user may also establish parental controls for the programs associated with the program listings (e.g., based on ratings information) and may access web links (e.g., web links related to personal television channel programming).

Another feature that may be provided at step 228 involves selecting personal television channel programs for automatic recording. The viewer may select a personal television program for recording from a program guide. When the program is scheduled to be aired, the program guide may direct the user equipment to automatically record the program. For example, if user equipment 34 is based on user television equipment 36, the program may be recorded on digital video recorder 70 or videocassette recorder 68. These recording components may be controlled by the set-top box 62 using infrared commands, wireless commands or commands supplied over a wire link. If user equipment 34 is a personal computer 78, the program may be recorded on the computer's hard drive or other storage device associated with the computer.

The viewer may also be provided with an opportunity to select certain programs or channels as being favorites at step 228. Favorites may be selected by pressing a fav button on a remote control or otherwise indicating which programs or channels are favorites. The program guide may display lists of programming based on which programs and channels have been selected as favorites.

The viewer may be allowed to view information on personal television channel programs. For example, if the user equipment is user television equipment, the viewer may be allowed to highlight a desired personal television channel program title on a screen displayed by the program guide and press an info button or other suitable key on a remote control. In response, the program guide may display an information screen containing information on the selected program. The information may include the program description information that the contributor provided using option 212 (FIG. 14). If the user equipment is user computer equipment and the program guide is an on-line program guide, for example, the viewer may click on a desired program title to be presented with more information.

In homes with multiple viewers, user profiles may be established, so that each viewer may have a customized set of favorites, etc.

At step 230, video may be received at one or more user equipment locations in real time or on demand.

Figure 17:
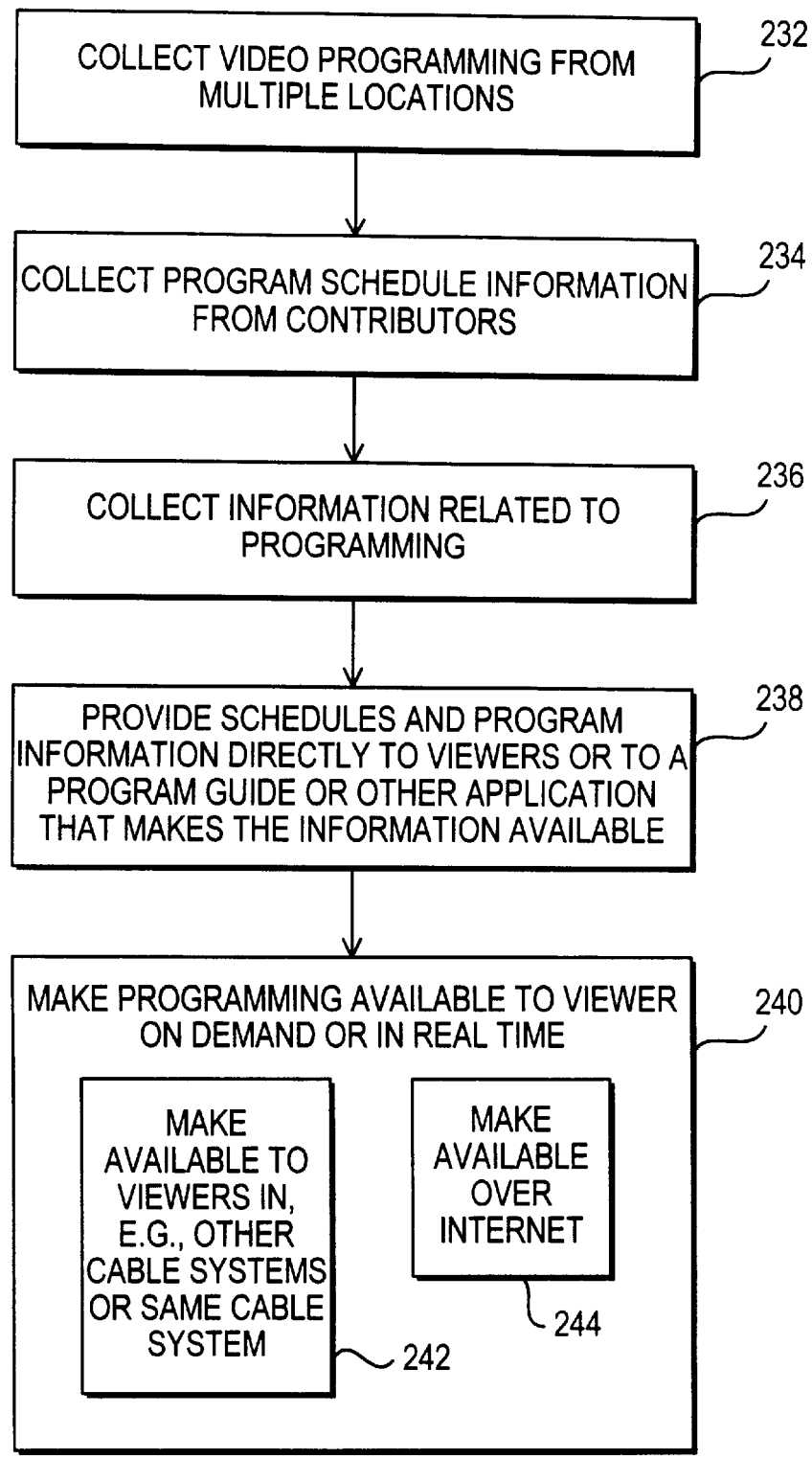
FIG. 17 is a flow chart of illustrative steps involved in providing personal television channel programming in accordance with the present invention.

Tasks related to supporting personal televison channel programming using system 30 of FIG. 1 may be performed using server 50 (FIG. 1), server 112 (FIG. 7), server 118 (FIG. 7), or server 110 (FIG. 7), or other suitable computer processing equipment or a combination of such components. Steps involved in performing these support tasks are shown in FIG. 17. At step 232, video programming is collected from multiple contributors. For example, contributors with personal television channel programs to contribute may upload programs from multiple user equipment locations.

At step 234, personal televison channel program schedule information may be collected from the contributors. The schedule information may be supplemented at data storage facility 52 to include information that system 30 and viewer equipment 34 use to determine how to access the personal television channel programs. For example, television distribution facilities and Internet service providers may supplement the schedule information with information for channel maps that link certain personal television channels with digital or analog television channels on a viewer's set-top box or that link certain personal television channels with Internet address information that may be used to locate the channels when a viewer desires to view certain personal television channel programming. At step 236, information related to the programming (e.g., program descriptions or channel descriptions) may be collected from contributors. At step 238, schedules and program information are provided to viewers. Schedules and program information may be provided to viewers directly (e.g., by transmitting this data to user equipment for use in a program guide or other interactive television application or the like). Schedules and program information may also be provided using an on-line program guide arrangement. With this approach schedules and program information are provided to a server that the user may access (e.g., using a web browser or the like).

At step 240, system 30 makes personal television channel programming available to viewers. If the contributor is a subscriber in a given cable system (i.e., the contributor's user equipment is connected to a cable system headend in that system), step 240 may involve the step 242 of making personal television channel programming from the contributor available to viewers in other cable systems or to other viewers in the same cable system. Step 240 may also involve the step 244 of making programming available over the Internet.

Figure 18:
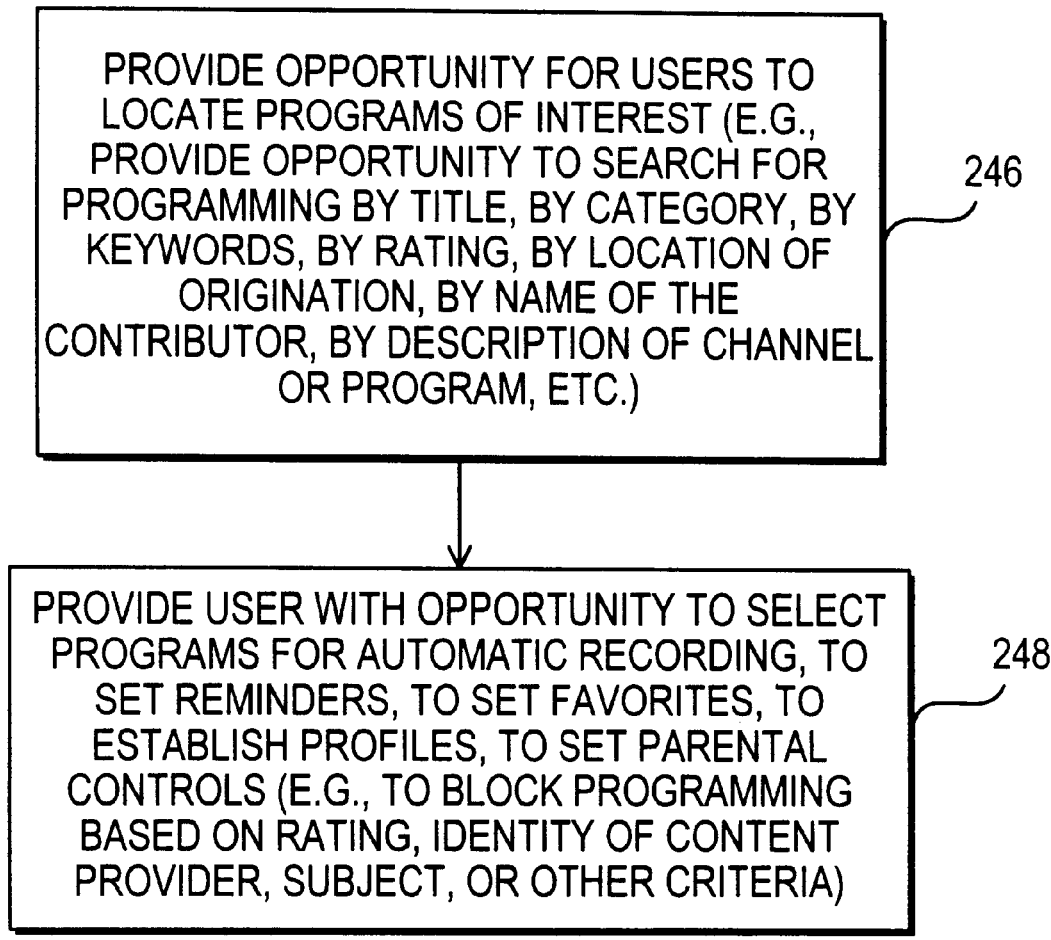
FIG. 18 is a flow chart of illustrative steps involved in providing schedule information and interactive television application features to viewers in accordance with the present invention.

A number of features may be made available in system 30 using server 50 (FIG. 1), server 112 (FIG. 7), server 118 (FIG. 7), or server 110 (FIG. 7), or other suitable computer processing equipment or a combination of such components or using user equipment 34. Steps involved in providing these features are shown in FIG. 18.

At step 246, the system provides viewers with an opportunity to locate personal television channel programs of interest. For example, a program guide may be used to allow programs to be located using a search feature. Programming may be searched by title or by category. In order to allow programming to be searched by category, the contributor may be asked to supply category information during the process of collecting schedule information and programming information at steps 234 and 236 of FIG. 17. Step 246 also involves searching programing by keywords, by rating, by location of origination, by name of the programmer, by description of the channel or program, etc.

At step 248, the system provides the viewers with an opportunity to select certain personal television channel programs for automatic recording. When the scheduled broadcast time of a selected program arrives, a recording device such as videocassette recorder 68 or digital video recorder 70 of FIG. 3 may be automatically directed (e.g., by set-top box 62) to record the program for the user. The system also provides the viewers with an opportunity to set reminders for personal television channel programs of interest. When a reminder is set for a given program, an on-screen reminder messages may be displayed on user equipment 34 just before the scheduled broadcast time of the program to alert the user that the program is about to begin. The reminder message may contain a selectable option that allows the user to directly tune to the personal television channel for the program. This tuning operation may involve launching or activating video software such as an application that processes streaming Internet video or the like or may involve tuning to a digital television channel.

Step 248 also involves providing the user with an opportunity to set favorites. For example, certain personal television channels may be set as favorites. When desired, the user may direct a program guide to display a list of the programs scheduled to appear on the favorite channels. The program guide or other software that controls the tuning and video reception functions of user equipment 34 may be configured so that a favorites mode may be turned on or off. When the favorites mode is off, the user may tune to each available traditional television channel and each available personal televison channel in sequence. When the favorites mode is on, tuning is restricted to those channels that have been designated as favorites. Favorites may also be based on favorites categories, programs, actors, etc. Multiple profiles may be established to accommodate multiple users in a single household. For example, each user profile may contain a different set of favorite personal television channels or other favorite settings that are applied to personal television channels.

Step 248 may involve applying parental controls or other user viewing restrictions to the personal television channel content. For example, a program guide or other application may be used to block access to personal television channel programming based on rating, the identity of the contributor of the personal television channel programming, the subject matter of the personal television channel programming, or any other suitable parental control settings). If desired, contributors may establish passwords to restrict access to a personal television channel. Only those users who provide the password at step 248 may view the desired personal television channel programming.

Links may be provided between personal television channels or personal television programs and other content. For example, links may be provided to web sites, chat sessions, other personal television channels, etc.

Figure 19:
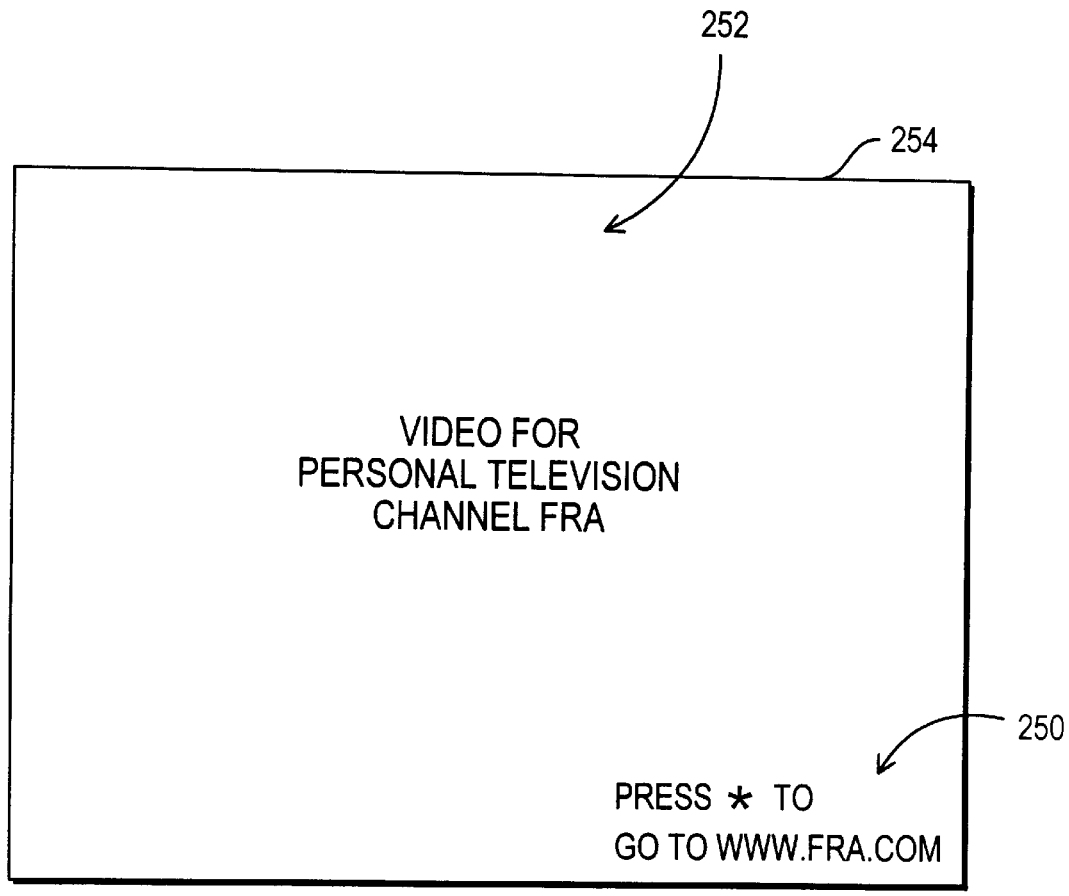
FIG. 19 is a diagram of an illustrative video for a personal television channel program showing how information on an available link may be displayed on top of the video in accordance with the present invention.

A program guide may allow a viewer to display content related to a given personal television channel or personal television program on the user's display while personal television programming is being viewed. For example, as shown in FIG. 19, information regarding a web site link 250 may be displayed at the same time that video 252 for a personal television channel is being displayed on screen 254. In the example of FIG. 19, when the user presses the star key on a remote control, a program guide or other application may launch a web browser and direct the web browser to retrieve the web page for www.fra.com, which is the web site associated with the currently displayed personal television channel.

Figure 20:
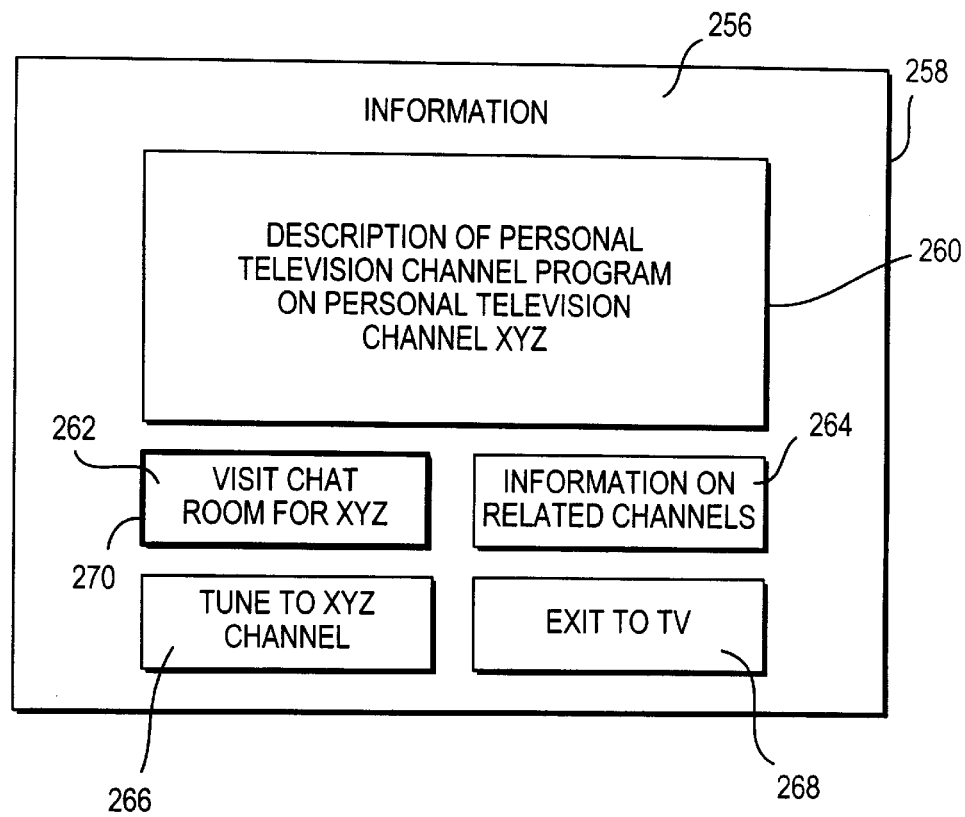
FIG. 20 is an illustrative information screen that may be provided for a personal television program in accordance with the present invention.

Another illustrative arrangement is shown in FIG. 20. As shown in FIG. 20, a program guide or other application may display an information screen 256 on screen 258 when, for example, a user presses an info button on a remote control while highlighting schedule information (e.g., the title) for a given personal television channel program. The information screen 256 may contain a detailed description 260 of the given personal television channel program. Options 262, 264, 266, and 268 may be provided that may be selected by positioning highlight region 270 on top of a desired option and pressing a select key on a remote control. In a computer-based system, the user may select a desired option by clicking on the option using a mouse or trackball.

Options such as option 262 may be used to provide a link to a chat room related to the XYZ channel or the current program on that channel. Selecting option 264 may direct the program guide or other application to display information on related channels. The channels may be related by common subject matter or other suitable criteria. Selecting option 266 directs the user equipment to tune to the XYZ channel. Option 268 allows the user to exit the screen 256.

The linking examples of FIGS. 19 and 20 are merely illustrative. Links may be provided to any suitable feature, including programming-related features, program guide features, and features related to interactive television applications such as chat applications, e-mail applications, shopping applications, interactive game applications, interactive wagering applications, etc. Links may be provided from any suitable location, such as from a currently displayed personal television channel (as shown in FIG. 19), from an information screen (as shown in FIG. 20), from other program guide screens, from screens provided by other applications, etc.

The foregoing is merely illustrative of the principles of this invention and various modifications can be made by those skilled in the art without departing from the scope and spirit of the invention.

What is claimed is:

1. A method for using a system in which personal television programs are scheduled for distribution to viewers on personal television channels, comprising:

providing an opportunity for different contributors who are individuals to supply personal television program schedule information to a program schedule database that indicates particular future times and dates at which certain personal television programs are to be available for viewing by the viewers on viewer equipment;

providing the viewers with access to the personal television program schedule information at the viewer equipment;

providing the personal television programs from the contributor equipment of different individual contributors to the viewer equipment of each of the viewers over a communications network; and providing each of the contributors with an opportunity to provide the program schedule database with a description of that contributor's personal television channel.

2. The method defined in claim 1 further comprising allowing the viewers to access the personal television program schedule information using a program guide implemented on a set-top box connected to a television.

3. The method defined in claim 1 further comprising allowing the viewers to access the personal television program schedule information using an on-line program guide.

4. The method defined in claim 1 further comprising providing a display screen to the viewers that contains a list of certain recommended personal television channels.

5. The method defined in claim 1 further comprising displaying a screen to the viewers that contains a list of certain sports-related personal television channels.

6. The method defined in claim 1 further comprising displaying a screen to the viewers that contains a list of both traditional television programs and personal television programs.

7. The method defined in claim 1 further comprising:

displaying a screen to the viewers that contains a list of the personal television programs; and allowing a viewer to display a movable highlight region in the screen on top of certain desired personal television programs.

8. The method defined in claim 1 further comprising:
displaying a screen to the viewers that contains a list of the personal television programs;
allowing a viewer to display a movable highlight region in the screen on top of certain desired personal television programs; and
allowing the viewer to access additional information for those programs by pressing a remote control button.

9. The method defined in claim 1 further comprising providing the viewers with an opportunity to search through the personal television program schedule information in the program schedule database to locate desired personal television programs based on title information.

10. The method defined in claim 1 further comprising providing the viewers with an opportunity to search through the personal television program schedule information in the program schedule database to locate desired programs based on category information.

11. The method defined in claim 1 wherein the personal television programs are provided on personal television channels, the method further comprising providing each of the viewers with an opportunity to view a description of the personal television channels.

12. The method defined in claim 1 further comprising:
displaying a screen to the viewers that contains a list of the personal television programs; and
providing the viewers with an opportunity to select a given one of the personal television programs from the list for automatic recording on the viewer equipment.

13. The method defined in claim 1 further comprising providing the viewers with an opportunity to select certain personal television programs as favorites.

14. The method defined in claim 1 wherein the personal television programs are provided on personal television channels, and wherein the method further comprises providing the viewers with an opportunity to select certain personal television channels as favorites.

15. The method defined in claim 1 further comprising displaying a list of programming on the viewer equipment, wherein the list includes both traditional television programs and personal television programs, and wherein at least some of the personal television channels are available for viewing on demand.

16. The method defined in claim 1 further comprising:
displaying video for one of the personal television programs on the viewer equipment; and
displaying linking information as an overlay on top of the displayed video.

17. The method defined in claim 1 further comprising providing a link from a personal television program to a web site.

18. The method defined in claim 1 further comprising:
displaying video for a given one of the personal television programs on the viewer equipment; and
providing a viewer-selectable link related to the given personal television program.

19. The method defined in claim 1 further comprising:
displaying a list of personal television programs on the viewer equipment;
allowing the viewer to select a given one of the personal television programs; and
displaying an information screen containing information on the selected personal television program.

20. The method defined in claim 1 further comprising:
allowing the viewer to select a given one of the personal television programs; and
displaying a viewer-selectable option that tunes the viewer equipment to a channel related to the given one of the personal television programs.

21. The method defined in claim 1 further comprising providing the viewers with an opportunity to locate personal television programs in the program schedule database based on the name of the contributor.

22. The method defined in claim 1 further comprising providing the viewers with an opportunity to block personal television programs based on parental control settings.

23. The method defined in claim 1 wherein providing the personal television programs from the contributor equipment of different individual contributors to the viewer equipment comprises providing the personal television programs from the contributor equipment of different individual contributors to the viewer equipment in real time.

24. The method defined in claim 1 wherein providing the personal television programs from the contributor equipment of different individual contributors to the viewer equipment comprises providing the personal television programs from the contributor equipment of different individual contributors to the viewer equipment over the Internet in real time.

25. The method defined in claim 1 wherein providing the personal television programs from the contributor equipment of different individual contributors to the viewer equipment comprises:
providing the personal television programs from the contributor equipment of different individual contributors to a cable system headend over the Internet in real time; and
distributing the personal television programs from the cable system headend to the viewer equipment of the viewers as an MPEG stream.

26. The method defined in claim 1 further comprising distributing the personal television program schedule information to the viewer equipment by distributing the personal television program schedule information to a plurality of television distribution facilities from the program schedule database by satellite and by distributing the personal television program schedule information from each of the television distribution facilities to a plurality of viewers who are associated with that television distribution facility.

27. The method defined in claim 1 further comprising distributing the personal television program schedule information to the viewer equipment by simultaneously distributing the personal television program schedule information to a plurality of cable system headends from the program schedule database by satellite and by distributing the personal television program schedule information from each of the cable system headends to a plurality of viewers who are associated with that cable system headend.

28. The method defined in claim 1, wherein the viewer equipment of each viewer comprises a set-top box, the method further comprising distributing the personal television program schedule information to the set-top box of each viewer by simultaneously distributing the personal television program schedule information to a plurality of cable system headends from the program schedule database by satellite and by distributing the personal television program schedule information from each of the cable system headends to a plurality of set-top boxes of viewers who are associated with that cable system headend.

29. A system in which personal television programs are scheduled for distribution to viewers on personal television channels, the system comprising:
means for providing an opportunity for different contributors who are individuals to supply personal television program schedule information to a program schedule database that indicates particular future times and dates at which certain personal television programs are to be available for viewing by the viewers on viewer equipment;

means for providing the viewers with access to the personal television program schedule information at the viewer equipment;

means for providing the personal television programs from the contributor equipment of different individual contributors to the viewer equipment of each of the viewers over a communications network; and means for providing each of the contributors with an opportunity to provide the program schedule database with a description of that contributor's personal television channel.

30. The system defined in claim 29 further comprising means for allowing the viewers to access the personal television program schedule information using a program guide implemented on a set-top box connected to a television.

31. The system defined in claim 29 further comprising means for allowing the viewers to access the personal television program schedule information using an on-line program guide.

32. The system defined in claim 29 further comprising means for providing a display screen to the viewers that contains a list of certain recommended personal television channels.

33. The system defined in claim 29 further comprising means for displaying a screen to the viewers that contains a list of certain sports-related personal television channels.

34. The system defined in claim 29 further comprising means for displaying a screen to the viewers that contains a list of both traditional television programs and personal television programs.

35. The system defined in claim 29 further comprising:
means for displaying a screen to the viewers that contains a list of the personal television programs; and
means for allowing a viewer to display a movable highlight region in the screen on top of certain desired personal television programs.

36. The system defined in claim 29 further comprising:
means for displaying a screen to the viewers that contains a list of the personal television programs;
means for allowing a viewer to display a movable highlight region in the screen on top of certain desired personal television programs; and
means for allowing the viewer to access additional information for those programs by pressing a remote control button.

37. The system defined in claim 29 further comprising means for providing the viewers with an opportunity to search through the personal television program schedule information in the program schedule database to locate desired personal television programs based on title information.

38. The system defined in claim 29 further comprising means for providing the viewers with an opportunity to search through the personal television program schedule information in the program schedule database to locate desired programs based on category information.

39. The system defined in claim 29 wherein the personal television programs are provided on personal television channels, the system further comprising means for providing each of the viewers with an opportunity to view a description of the personal television channels.

40. The system defined in claim 29 further comprising:
means for displaying a screen to the viewers that contains a list of the personal television programs; and
means for providing the viewers with an opportunity to select a given one of the personal television programs from the list for automatic recording on the viewer equipment.

41. The system defined in claim 29 further comprising means for providing the viewers with an opportunity to select certain personal television programs as favorites.

42. The system defined in claim 29 wherein the personal television programs are provided on personal television channels, and wherein the system further comprises means for providing the viewers with an opportunity to select certain personal television channels as favorites.

43. The system defined in claim 29 further comprising means for displaying a list of programming on the viewer equipment, wherein the list includes both traditional television programs and personal television programs, and wherein at least some of the personal television channels are available for viewing on demand.

44. The system defined in claim 29 further comprising:
means for displaying video for one of the personal television programs on the viewer equipment; and
means for displaying linking information as an overlay on top of the displayed video.

45. The system defined in claim 29 further comprising means for providing a link from a personal television program to a web site.

46. The system defined in claim 29 further comprising:
means for displaying video for a given one of the personal television programs on the viewer equipment; and
means for providing a viewer-selectable link related to the given personal television program.

47. The system defined in claim 29 further comprising:
means for displaying a list of personal television programs on the viewer equipment;
means for allowing the viewer to select a given one of the personal television programs; and
means for displaying an information screen containing information on the selected personal television program.

48. The system defined in claim 29 further comprising:
means for allowing the viewer to select a given one of the personal television programs; and
means for displaying a viewer-selectable option that tunes the viewer equipment to a channel related to the given one of the personal television programs.

49. The system defined in claim 29 further comprising means for providing the viewers with an opportunity to locate personal television programs in the program schedule database based on the name of the contributor.

50. The system defined in claim 29 further comprising means for providing the viewers with an opportunity to block personal television programs based on parental control settings.

51. The system defined in claim 29 wherein the means for providing the personal television programs from the contributor equipment of different individual contributors to the viewer equipment comprises means for providing the personal television programs from the contributor equipment of different individual contributors to the viewer equipment in real time.

52. The system defined in claim 29 wherein the means for providing the personal television programs from the contributor equipment of different individual contributors to the viewer equipment comprises means for providing the personal television programs from the contributor equipment of different individual contributors to the viewer equipment over the Internet in real time.

53. The system defined in claim 29 wherein the means for providing the personal television programs from the contributor equipment of different individual contributors to the viewer equipment comprises:

means for providing the personal television programs from the contributor equipment of different individual contributors to a cable system headend over the Internet in real time; and means for distributing the personal television programs from the cable system headend to the viewer equipment of the viewers as an MPEG stream.

54. The system defined in claim 29 further comprising means for distributing the personal television program schedule information to the viewer equipment by distributing the personal television program schedule information to a plurality of television distribution facilities from the program schedule database by satellite and by distributing the personal television program schedule information from each of the television distribution facilities to a plurality of viewers who are associated with that television distribution facility.

55. The system defined in claim 29 further comprising means for distributing the personal television program schedule information to the viewer equipment by simultaneously distributing the personal television program schedule information to a plurality of cable system headends from the program schedule database by satellite and by distributing the personal television program schedule information from each of the cable system headends to a plurality of viewers who are associated with that cable system headend.

56. The system defined in claim 29, wherein the viewer equipment of each viewer comprises a set-top box, the system further comprising means for distributing the personal television program schedule information to the set-top box of each viewer by simultaneously distributing the personal television program schedule information to a plurality of cable system headends from the program schedule database by satellite and by distributing the personal television program schedule information from each of the cable system headends to a plurality of set-top boxes of viewers who are associated with that cable system headend.

57. A system in which personal television programs are scheduled for distribution to viewers on personal television channels, comprising:

contributor equipment that allows different contributors who are individuals to supply personal television program schedule information and a description of that contributor's personal television channel to a program schedule database, wherein the personal television program schedule information indicates particular future times and dates at which certain personal television programs are to be available for viewing by the viewers;

viewer equipment that provides the viewers with access to the personal television program schedule information; and a communications network connected to the contributor equipment and the viewer equipment, wherein the communications network provides the personal television programs from the contributor equipment of different individual contributors to the viewer equipment of each of the viewers.

58. The system defined in claim 57, wherein the viewer equipment comprises a set-top box connected to a television, and wherein the viewer equipment allows the viewers to access the personal television program schedule information using a program guide implemented on the set-top box.

59. The system defined in claim 57, wherein the viewer equipment allows the viewers to access the personal television program schedule information using an on-line program guide.

60. The system defined in claim 57, wherein the viewer equipment provides a display screen to the viewers that contains a list of certain recommended personal television channels.

61. The system defined in claim 57, wherein the viewer equipment displays a screen to the viewers that contains a list of certain sports-related personal television channels.

62. The system defined in claim 57, wherein the viewer equipment displays a screen to the viewers that contains a list of both traditional television programs and personal television programs.

63. The system defined in claim 57, wherein the viewer equipment:

displays a screen to the viewers that contains a list of the personal television programs; and allows a viewer to display a movable highlight region in the screen on top of certain desired personal television programs.

64. The system defined in claim 57, wherein the viewer equipment:

displays a screen to the viewers that contains a list of the personal television programs;

allows a viewer to display a movable highlight region in the screen on top of certain desired personal television programs; and allows the viewer to access additional information for those programs by pressing a remote control button.

65. The system defined in claim 57, wherein the viewer equipment further provides the viewers with an opportunity to search through the personal television program schedule information in the program schedule database to locate desired personal television programs based on title information.

66. The system defined in claim 57, wherein the viewer equipment further provides the viewers with an opportunity to search through the personal television program schedule information in the program schedule database to locate desired programs based on category information.

67. The system defined in claim 57 wherein the personal television programs are provided on personal television channels, and wherein the viewer equipment provides each of the viewers with an opportunity to view a description of the personal television channels.

68. The system defined in claim 57, wherein the viewer equipment:

displays a screen to the viewers that contains a list of the personal television programs; and provides the viewers with an opportunity to select a given one of the personal television programs from the list for automatic recording on the viewer equipment.

69. The system defined in claim 57, wherein the viewer equipment further provides the viewers with an opportunity to select certain personal television programs as favorites.

70. The system defined in claim 57 wherein the personal television programs are provided on personal television channels, and wherein the viewer equipment further provides the viewers with an opportunity to select certain personal television channels as favorites.

71. The system defined in claim 57, wherein the viewer equipment displays a list of programming that includes both traditional television programs and personal television programs, and wherein at least some of the personal television channels are available for viewing on demand.

72. The system defined in claim 57, wherein the viewer equipment:
  displays video for one of the personal television programs; and
  displays linking information as an overlay on top of the displayed video.

73. The system defined in claim 57, wherein the viewer equipment further provides on a screen a link from a personal television program to a web site.

74. The system defined in claim 57, wherein the viewer equipment:
  displays video for a given one of the personal television programs; and
  provides a viewer-selectable link related to the given personal television program.

75. The system defined in claim 57, wherein the viewer equipment:
  displays a list of personal television programs;
  allows the viewer to select a given one of the personal television programs; and
  displays an information screen containing information on the selected personal television program.

76. The system defined in claim 57, wherein the viewer equipment:
  allows the viewer to select a given one of the personal television programs; and
  displays a viewer-selectable option that allows the user to tune the viewer equipment to a channel related to the given one of the personal television programs.

77. The system defined in claim 57, wherein the viewer equipment further provides the viewers with an opportunity to locate personal television programs in the program schedule database based on the name of the contributor.

78. The system defined in claim 57, wherein the viewer equipment further provides the viewers with an opportunity to block personal television programs based on parental control settings.

79. The system defined in claim 57, wherein the communications network provides the personal television programs from the contributor equipment of different individual contributors to the viewer equipment in real time.

80. The system defined in claim 57, wherein the communications network is the Internet and provides the personal television programs from the contributor equipment of different individual contributors to the viewer equipment in real time.

81. The system defined in claim 57, further comprising a cable system headend, and wherein the communications network is the Internet and provides the personal television programs from the contributor equipment of different individual contributors to the cable system headend in real time, and wherein the communications network provides the personal television programs from the cable system headend to the viewer equipment of the viewers as an MPEG stream.

82. The system defined in claim 57, further comprising a plurality of television distribution facilities, and wherein the communications network provides the personal television program schedule information from the program schedule database to the plurality of television distribution facilities by satellite, and wherein the communications network provides the personal television program schedule information from each of the television distribution facilities to a plurality of viewers who are associated with that television distribution facility.

83. The system defined in claim 57, further comprising a plurality of cable system headends, and wherein the communications network simultaneously provides the personal television program schedule information to the plurality of cable system headends from the program schedule database by satellite, and wherein the communications network provides the personal television program schedule information from each of the cable system headends to a plurality of viewers who are associated with that cable system headend.

84. The system defined in claim 57, wherein the viewer equipment of each viewer comprises a set-top box, and wherein the communications network provides the personal television program schedule information from the program schedule database to a plurality of cable system headends by satellite, and wherein the communications network provides the personal television program schedule information from each of the cable system headends to a plurality of set-top boxes of viewers who are associated with that cable system headend.

85. Machine-readable media for use in a system in which personal television programs are scheduled for distribution to viewers on personal television channels, wherein the machine-readable media is encoded with machine-readable instructions thereon for:
  providing an opportunity for different contributors who are individuals to supply personal television program schedule information to a program schedule database that indicates particular future times and dates at which certain personal television programs are to be available for viewing by the viewers on viewer equipment;
  providing the viewers with access to the personal television program schedule information at the viewer equipment;
  providing the personal television programs from the contributor equipment of different individual contributors to the viewer equipment of each of the viewers over a communications network; and
  providing each of the contributors with an opportunity to provide the program schedule database with a description of that contributor's personal television channel.

86. The machine-readable media defined in claim 85, wherein the machine-readable media is further encoded with machine-readable instructions thereon for allowing the viewers to access the personal television program schedule information using a program guide implemented on a set-top box connected to a television.

87. The machine-readable media defined in claim 85, wherein the machine-readable media is further encoded with machine-readable instructions thereon for allowing the viewers to access the personal television program schedule information using an on-line program guide.

88. The machine-readable media defined in claim 85, wherein the machine-readable media is further encoded with machine-readable instructions thereon for providing a display screen to the viewers that contains a list of certain recommended personal television channels.

89. The machine-readable media defined in claim 85, wherein the machine-readable media is further encoded with machine-readable instructions thereon for displaying a screen to the viewers that contains a list of certain sports-related personal television channels.

90. The machine-readable media defined in claim 85, wherein the machine-readable media is further encoded with machine-readable instructions thereon for displaying a screen to the viewers that contains a list of both traditional television programs and personal television programs.

91. The machine-readable media defined in claim 85, wherein the machine-readable media is further encoded with machine-readable instructions thereon for:
   displaying a screen to the viewers that contains a list of the personal television programs; and
   allowing a viewer to display a movable highlight region in the screen on top of certain desired personal television programs.

92. The machine-readable media defined in claim 85, wherein the machine-readable media is further encoded with machine-readable instructions thereon for:
   displaying a screen to the viewers that contains a list of the personal television programs;
   allowing a viewer to display a movable highlight region in the screen on top of certain desired personal television programs; and
   allowing the viewer to access additional information for those programs by pressing a remote control button.

93. The machine-readable media defined in claim 85, wherein the machine-readable media is further encoded with machine-readable instructions thereon for providing the viewers with an opportunity to search through the personal television program schedule information in the program schedule database to locate desired personal television programs based on title information.

94. The machine-readable media defined in claim 85, wherein the machine-readable media is further encoded with machine-readable instructions thereon for providing the viewers with an opportunity to search through the personal television program schedule information in the program schedule database to locate desired programs based on category information.

95. The machine-readable media defined in claim 85, wherein the personal television programs are provided on personal television channels, and wherein the machine-readable media is further encoded with machine-readable instructions thereon for providing each of the viewers with an opportunity to view a description of the personal television channels.

96. The machine-readable media defined in claim 85, wherein the machine-readable media is further encoded with machine-readable instructions thereon for:
   displaying a screen to the viewers that contains a list of the personal television programs; and
   providing the viewers with an opportunity to select a given one of the personal television programs from the list for automatic recording on the viewer equipment.

97. The machine-readable media defined in claim 85, wherein the machine-readable media is further encoded with machine-readable instructions thereon for providing the viewers with an opportunity to select certain personal television programs as favorites.

98. The machine-readable media defined in claim 85, wherein the personal television programs are provided on personal television channels, and wherein the machine-readable media is further encoded with machine-readable instructions thereon for providing the viewers with an opportunity to select certain personal television channels as favorites.

99. The machine-readable media defined in claim 85, wherein the machine-readable media is further encoded with machine-readable instructions thereon for displaying a list of programming on the viewer equipment, wherein the list includes both traditional television programs and personal television programs, and wherein at least some of the personal television channels are available for viewing on demand.

100. The machine-readable media defined in claim 85, wherein the machine-readable media is further encoded with machine-readable instructions thereon for:
   displaying video for one of the personal television programs on the viewer equipment; and
   displaying linking information as an overlay on top of the displayed video.

101. The machine-readable media defined in claim 85, wherein the machine-readable media is further encoded with machine-readable instructions thereon for providing a link from a personal television program to a web site.

102. The machine-readable media defined in claim 85, wherein the machine-readable media is further encoded with machine-readable instructions thereon for:
   displaying video for a given one of the personal television programs on the viewer equipment; and
   providing a viewer-selectable link related to the given personal television program.

103. The machine-readable media defined in claim 85, wherein the machine-readable media is further encoded with machine-readable instructions thereon for:
   displaying a list of personal television programs on the viewer equipment;
   allowing the viewer to select a given one of the personal television programs; and
   displaying an information screen containing information on the selected personal television program.

104. The machine-readable media defined in claim 85, wherein the machine-readable media is further encoded with machine-readable instructions thereon for:
   allowing the viewer to select a given one of the personal television programs; and
   displaying a viewer-selectable option that tunes the viewer equipment to a channel related to the given one of the personal television programs.

105. The machine-readable media defined in claim 85, wherein the machine-readable media is further encoded with machine-readable instructions thereon for providing the viewers with an opportunity to locate personal television programs in the program schedule database based on the name of the contributor.

106. The machine-readable media defined in claim 85, wherein the machine-readable media is further encoded with machine-readable instructions thereon for providing the viewers with an opportunity to block personal television programs based on parental control settings.

107. The machine-readable media defined in claim 85, wherein the machine-readable media is further encoded with machine-readable instructions thereon for providing the personal television programs from the contributor equipment of different individual contributors to the viewer equipment in real time.

108. The machine-readable media defined in claim 85, wherein the machine-readable media is further encoded with machine-readable instructions thereon for providing the personal television programs from the contributor equipment of different individual contributors to the viewer equipment over the Internet in real time.

109. The machine-readable media defined in claim 85, wherein the machine-readable media is further encoded with machine-readable instructions thereon for:
   providing the personal television programs from the contributor equipment of different individual contributors to a cable system headend over the Internet in real time; and distributing the personal television programs from the cable system headend to the viewer equipment of the viewers as an MPEG stream.

110. The machine-readable media defined in claim 85, wherein the machine-readable media is further encoded with machine-readable instructions thereon for distributing the personal television program schedule information to the viewer equipment by distributing the personal television program schedule information to a plurality of television distribution facilities from the program schedule database by satellite and by distributing the personal television program schedule information from each of the television distribution facilities to a plurality of viewers who are associated with that television distribution facility.

111. The machine-readable media defined in claim 85, wherein the machine-readable media is further encoded with machine-readable instructions thereon for distributing the personal television program schedule information to the viewer equipment by simultaneously distributing the personal television program schedule information to a plurality of cable system headends from the program schedule database by satellite and by distributing the personal television program schedule information from each of the cable system headends to a plurality of viewers who are associated with that cable system headend.

112. The machine-readable media defined in claim 85, wherein the viewer equipment comprises a set-top box, and wherein the machine-readable media is further encoded with machine-readable instructions thereon for distributing the personal television program schedule information to the set-top box of each viewer by simultaneously distributing the personal television program schedule information to a plurality of cable system headends from the program schedule database by satellite and by distributing the personal television program schedule information from each of the cable system headends to a plurality of set-top boxes of viewers who are associated with that cable system headend.

* * * * *